(12) United States Patent
Pezeshki et al.

(10) Patent No.: US 12,225,390 B2
(45) Date of Patent: Feb. 11, 2025

(54) MACHINE LEARNING MODEL SHARING BETWEEN WIRELESS NODES

(71) Applicant: QUALCOMM Incorporated, San Diego, CA (US)

(72) Inventors: Hamed Pezeshki, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 17/454,096

(22) Filed: Nov. 9, 2021

(65) Prior Publication Data

US 2022/0150727 A1 May 12, 2022

Related U.S. Application Data

(60) Provisional application No. 63/112,318, filed on Nov. 11, 2020.

(51) Int. Cl.
*H04W 24/02* (2009.01)
*H04L 41/14* (2022.01)
*H04L 41/16* (2022.01)

(52) U.S. Cl.
CPC ........... *H04W 24/02* (2013.01); *H04L 41/145* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 2020/0374711 | A1* | 11/2020 | Honkasalo | G06N 20/10 |
| 2020/0413316 | A1* | 12/2020 | Isaksson | H04W 36/362 |
| 2021/0160812 | A1 | 5/2021 | Manolakos et al. | |
| 2021/0329522 | A1 | 10/2021 | Li et al. | |
| 2021/0345134 | A1* | 11/2021 | Ottersten | H04W 16/22 |
| 2022/0051139 | A1* | 2/2022 | Tullberg | G06N 20/00 |
| 2022/0138621 | A1* | 5/2022 | Patil | G06N 3/084 706/11 |
| 2022/0191592 | A1* | 6/2022 | Gairuboina | H04N 21/44209 |
| 2022/0279341 | A1* | 9/2022 | Tomala | G06N 20/00 |
| 2022/0322195 | A1* | 10/2022 | Tullberg | H04W 24/02 |

(Continued)

FOREIGN PATENT DOCUMENTS

WO 2019172813 A1 9/2019

OTHER PUBLICATIONS

International Search Report and Written Opinion—PCT/US2021/072315—ISA/EPO—Feb. 23, 2022.

*Primary Examiner* — Liem H. Nguyen
(74) *Attorney, Agent, or Firm* — Patterson & Sheridan LLP

(57) ABSTRACT

Certain aspects of the present disclosure provide techniques for sharing machine learning models and an indication of transmission and reception points (TRPs) for which the machine learning models are applicable between wireless nodes such as user equipments (UEs) and base stations (BSs). For example, a UE receives an indication of one or more machine learning models associated with at least one TRP of one or more TRPs from a BS. The UE then uses the at least one of the one or more machine learning models for applications related to the at least one TRP. The applications may include a channel state information (CSI) compression, a cross frequency channel prediction, and a beam selection.

30 Claims, 17 Drawing Sheets

(56) References Cited

U.S. PATENT DOCUMENTS

| | | | |
|---|---|---|---|
| 2023/0004864 A1* | 1/2023 | Wang | G06N 20/00 |
| 2023/0016595 A1* | 1/2023 | Ryden et al. | G01S 5/0036 |
| 2023/0058223 A1* | 2/2023 | Martins | G06N 3/047 |
| 2023/0262448 A1* | 8/2023 | Ryden et al. | G06N 3/045 |
| | | | 455/418 |
| 2023/0292168 A1* | 9/2023 | Tomala | G06N 20/00 |
| 2023/0297884 A1* | 9/2023 | Karapantelakis | G06N 20/00 |
| | | | 706/12 |
| 2023/0318749 A1* | 10/2023 | Lins De Medeiros | H04L 1/1896 |
| | | | 370/329 |
| 2023/0319667 A1* | 10/2023 | Park | H04W 36/0083 |
| | | | 370/331 |
| 2023/0409962 A1* | 12/2023 | Butt | G06N 20/00 |

* cited by examiner

MACHINE LEARNING MODEL SHARING BETWEEN WIRELESS NODES

CROSS-REFERENCE TO RELATED APPLICATION

This application claims benefit of and priority to U.S. Provisional Patent Application No. 63/112,318, filed Nov. 11, 2020, which is hereby incorporated by reference in its entirety.

BACKGROUND

Field of the Disclosure

Aspects of the present disclosure relate to wireless communications and, more particularly, to techniques for sharing machine learning models between wireless nodes.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

Systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for sharing transmission and reception point (TRP) specific machine learning models between wireless nodes such as user equipments (UEs) and base stations (BSs).

Certain aspects of the subject matter described in this disclosure can be implemented in a method for wireless communications by a UE. The method may include determining one or more machine learning models associated with at least one TRP of one or more TRPs, and transmitting an indication of the one or more machine learning models to a network entity.

Certain aspects of the subject matter described in this disclosure can be implemented in an apparatus for wireless communications by a UE. The apparatus generally includes at least one application processor and a memory configured to: determine one or more machine learning models associated with at least one TRP of one or more TRPs, and transmit an indication of the one or more machine learning models to a network entity.

Certain aspects of the subject matter described in this disclosure can be implemented in an apparatus for wireless communications by a UE. The apparatus generally includes means for determining one or more machine learning models associated with at least one TRP of one or more TRPs, and means for transmitting an indication of the one or more machine learning models to a network entity.

Certain aspects of the subject matter described in this disclosure can be implemented in a computer readable medium storing computer executable code thereon for wireless communications by a UE. The computer readable medium generally includes code for determining one or more machine learning models associated with at least one TRP of one or more TRPs, and code for transmitting an indication of the one or more machine learning models to a network entity.

Certain aspects of the subject matter described in this disclosure can be implemented in a method for wireless communications by a UE. The method may include receiving from a network entity an indication of one or more machine learning models associated with at least one TRP of one or more TRPs, and using at least one of the one or more machine learning models for applications related to the at least one TRP.

Certain aspects of the subject matter described in this disclosure can be implemented in an apparatus for wireless communications by a UE. The apparatus generally includes at least one application processor and a memory configured to: receive from a network entity an indication of one or more machine learning models associated with at least one TRP of one or more TRPs, and use at least one of the one or more machine learning models for applications related to the at least one TRP.

Certain aspects of the subject matter described in this disclosure can be implemented in an apparatus for wireless communications by a UE. The apparatus generally includes means for receiving from a network entity an indication of one or more machine learning models associated with at least one TRP of one or more TRPs, and means for using at least one of the one or more machine learning models for applications related to the at least one TRP.

Certain aspects of the subject matter described in this disclosure can be implemented in a computer readable medium storing computer executable code thereon for wireless communications by a UE. The computer readable medium generally includes code for receiving from a network entity an indication of one or more machine learning models associated with at least one TRP of one or more TRPs, and code for using at least one of the one or more machine learning models for applications related to the at least one TRP.

Certain aspects of the subject matter described in this disclosure can be implemented in a method for wireless communications by a network entity. The method may include receiving from a UE an indication of one or more machine learning models associated with at least one TRP of one or more TRPs supported by the network entity, and associating the one or more machine learning models with the at least one TRP.

Certain aspects of the subject matter described in this disclosure can be implemented in an apparatus for wireless communications by a network entity. The apparatus generally includes at least one application processor and a memory configured to: receive from a UE an indication of one or more machine learning models associated with at least one TRP of one or more TRPs supported by the network entity, and associate the one or more machine learning models with the at least one TRP.

Certain aspects of the subject matter described in this disclosure can be implemented in an apparatus for wireless communications by a network entity. The apparatus generally includes means for receiving from a UE an indication of one or more machine learning models associated with at least one TRP of one or more TRPs supported by the network entity, and means for associating the one or more machine learning models with the at least one TRP.

Certain aspects of the subject matter described in this disclosure can be implemented in a computer readable medium storing computer executable code thereon for wireless communications by a network entity. The computer readable medium generally includes code for receiving from a UE an indication of one or more machine learning models associated with at least one TRP of one or more TRPs supported by the network entity, and code for associating the one or more machine learning models with the at least one TRP.

Certain aspects of the subject matter described in this disclosure can be implemented in a method for wireless communications by a network entity. The method may include determining one or more machine learning models associated with at least one TRP of one or more TRPs supported by the network entity, and transmitting to a UE an indication of the one or more machine learning models.

Certain aspects of the subject matter described in this disclosure can be implemented in an apparatus for wireless communications by a network entity. The apparatus generally includes at least one application processor and a memory configured to: determine one or more machine learning models associated with at least one TRP of one or more TRPs supported by the network entity, and transmit to a UE an indication of the one or more machine learning models.

Certain aspects of the subject matter described in this disclosure can be implemented in an apparatus for wireless communications by a network entity. The apparatus generally includes means for determining one or more machine learning models associated with at least one TRP of one or more TRPs supported by the network entity, and means for transmitting to a UE an indication of the one or more machine learning models.

Certain aspects of the subject matter described in this disclosure can be implemented in a computer readable medium storing computer executable code thereon for wireless communications by a network entity. The computer readable medium generally includes code for determining one or more machine learning models associated with at least one TRP of one or more TRPs supported by the network entity, and code for transmitting to a UE an indication of the one or more machine learning models.

Certain aspects of the subject matter described in this disclosure can be implemented in a method for wireless communications by a UE. The method may include at least one of transmitting to a network entity or receiving from the network entity one or more machine learning models and an indication of one or more TRPs for which the one or more machine learning models are applicable. The method may include using a first machine learning model of the one or more machine learning models that is applicable for a first TRP of the one or more TRPs based on the indication.

Certain aspects of the subject matter described in this disclosure can be implemented in a method for wireless communications by a network entity. The method may include at least one of sending to a UE or receiving from the UE, one or more machine learning models and an indication of one or more TRPs for which the one or more machine learning models are applicable.

Certain aspects of the subject matter described in this disclosure can be implemented in a UE. The UE may include A UE, comprising: a transceiver configured to, at least one of, transmitting to a network entity or receiving from the network entity one or more machine learning models and an indication of one or more TRPs for which the one or more machine learning models are applicable; and a processing system configured to use a first machine learning model of the one or more machine learning models that is applicable for a first TRP of the one or more TRPs based on the indication.

Certain aspects of the subject matter described in this disclosure can be implemented in a network entity. The network entity may include a transceiver configured to, at least one of, sending to a UE or receiving from the UE: one or more machine learning models; and an indication of one or more TRPs for which the one or more machine learning models are applicable.

Certain aspects of the subject matter described in this disclosure can be implemented in a UE. The UE may include at least one of means for transmitting to a network entity or means for receiving from the network entity one or more machine learning models and an indication of one or more TRPs for which the one or more machine learning models are applicable; and means for using a first machine learning model of the one or more machine learning models that is applicable for a first TRP of the one or more TRPs based on the indication.

Certain aspects of the subject matter described in this disclosure can be implemented in a network entity. The network entity may include at least one of means for sending to a UE or means for receiving from the UE: one or more machine learning models; and an indication of one or more TRPs for which the one or more machine learning models are applicable.

Certain aspects of the subject matter described in this disclosure can be implemented in an apparatus for wireless communications by a UE. The apparatus may include an interface configured to, at least one of, output for transmission to a network entity or obtain from the network entity one or more machine learning models and an indication of one or more TRPs for which the one or more machine learning models are applicable; and a processing system configured to use a first machine learning model of the one or more machine learning models that is applicable for a first TRP of the one or more TRPs based on the indication.

Certain aspects of the subject matter described in this disclosure can be implemented in an apparatus for wireless communications by a network entity. The network entity may include an interface configured to, at least one of, output for transmission to a network entity or obtain from the network entity one or more machine learning models and an indication of one or more TRPs for which the one or more machine learning models are applicable; and a processing system configured to use a first machine learning model of the one or more machine learning models that is applicable for a first TRP of the one or more TRPs based on the indication.

Certain aspects of the subject matter described in this disclosure can be implemented in a computer-readable medium for wireless communications by a UE. The computer-readable medium may include codes executable to at least one of output for transmission to a network entity or obtain from the network entity one or more machine learning models and an indication of one or more TRPs for which the one or more machine learning models are applicable; and use a first machine learning model of the one or more machine learning models that is applicable for a first TRP of the one or more TRPs based on the indication.

Certain aspects of the subject matter described in this disclosure can be implemented in a computer-readable medium for wireless communications by a network entity. The computer-readable medium may include codes executable to provide one or more machine learning models; generate an indication of one or more TRPs for which the one or more machine learning models are applicable; and at least one of output for transmission to a UE or obtaining from the UE the one or more machine learning models and the indication of the one or more TRPs for which the one or more machine learning models are applicable.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
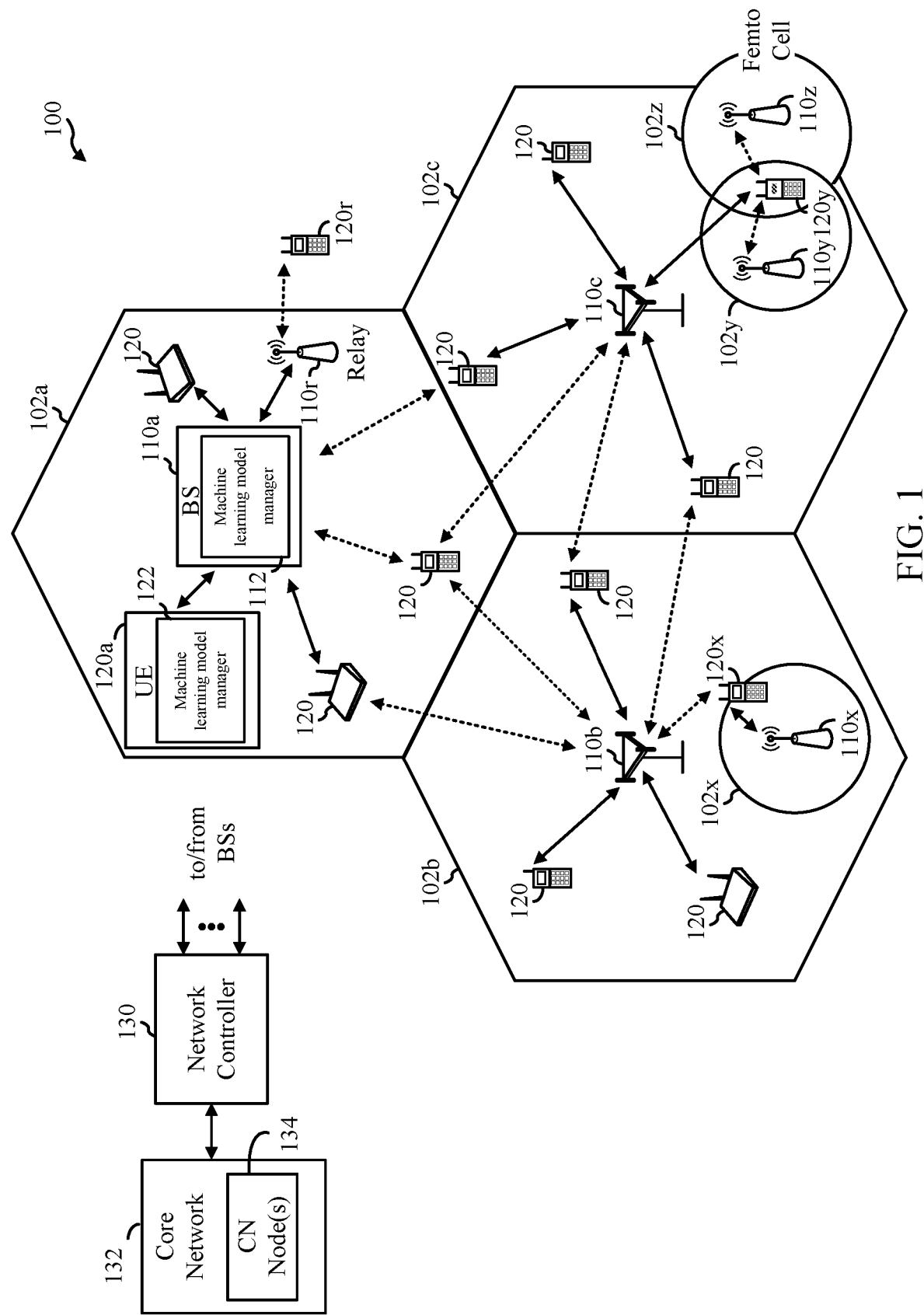
FIG. 1 is a block diagram conceptually illustrating an example wireless communication network, in accordance with certain aspects of the present disclosure.

Aspects of the present disclosure provide apparatus, methods, processing systems, and computer readable mediums for sharing machine learning models and an indication of transmission and reception points (TRPs) for which the machine learning models are applicable between wireless nodes such as user equipments (UEs) and base stations (BSs). For example, a UE may determine and execute a machine learning model that is applicable for a serving TRP associated with a BS based on the indication. The UE may use the machine learning model for various wireless communication applications including, but not limited to, a channel state information (CSI) compression, a cross frequency channel prediction, a beam selection, etc.

The following description provides examples techniques for sharing machine learning models between wireless nodes, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

Example Wireless Communication System

FIG. 1 illustrates an example wireless communication network 100, in which aspects of the present disclosure may be practiced. The wireless communication network 100 may include one or more base stations (BSs) 110a (with a machine learning model manager 112) configured to perform operations 700 of FIG. 7, operations 800 of FIG. 8, and operations 1000 of FIG. 10. The wireless communication network 100 may further include one or more user equipments (UEs) 120a (with a machine learning model manager 122) configured to perform operations 500 of FIG. 5, operations 600 of FIG. 6, and operations 900 of FIG. 9.

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
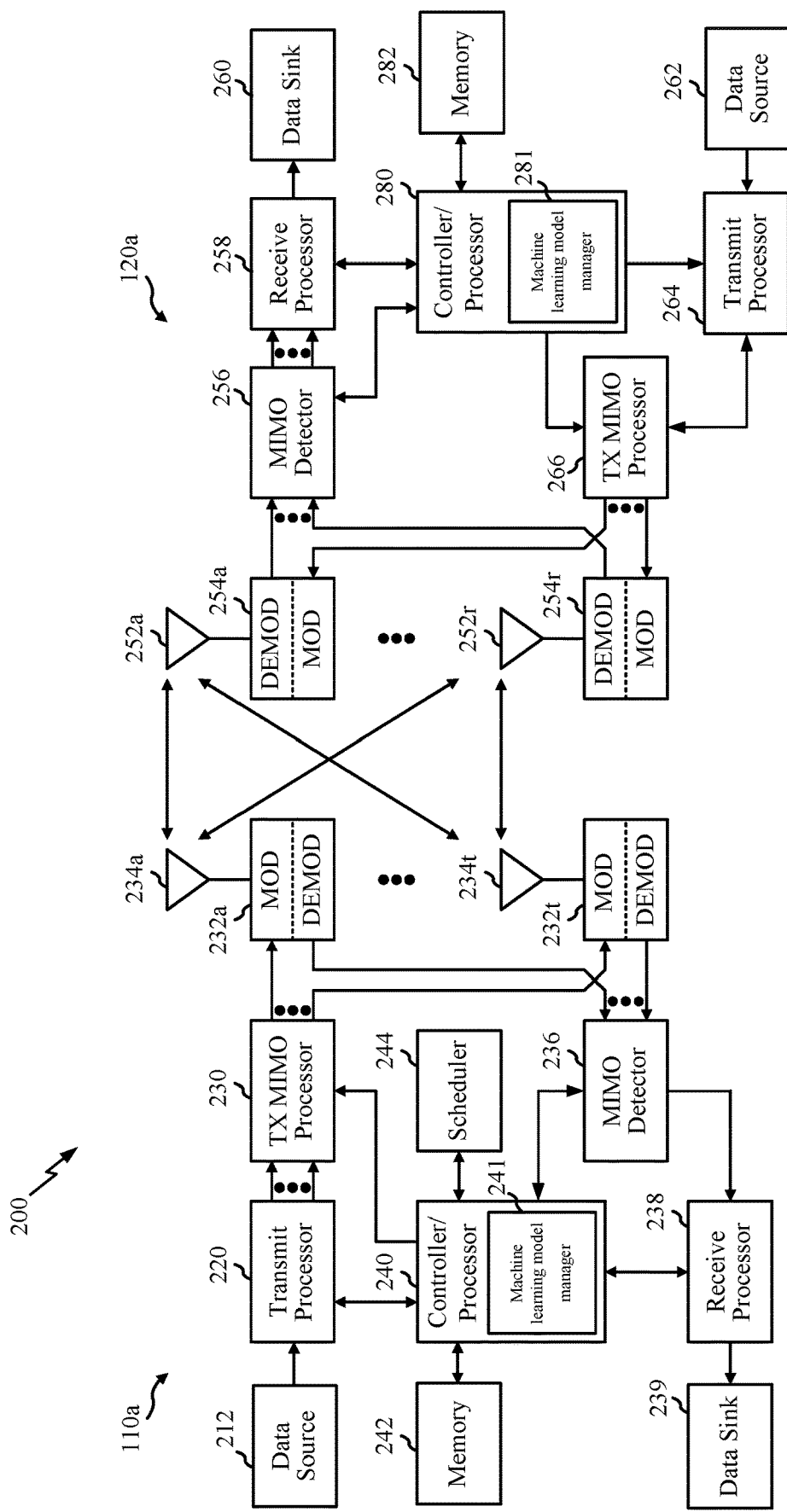
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via antennas 234a-234t, respectively.

At the UE 120a, antennas 252a-252r may receive the downlink signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform various techniques and methods described herein for sharing machine learning models between UEs and BSs. For example, as shown in FIG. 2, the controller/processor 240 of the BS 110a includes a machine learning model manager 241 that may be configured to perform the operations illustrated in FIG. 7, FIG. 8, and FIG. 10. As shown in FIG. 2, the controller/processor 280 of the UE 120a includes a machine learning model manager 281 that may be configured to perform the operations illustrated in FIG. 5, FIG. 6, and FIG. 9. Although shown at the controller/processor, other components of the UE 120a and the BS 110a may be used performing the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
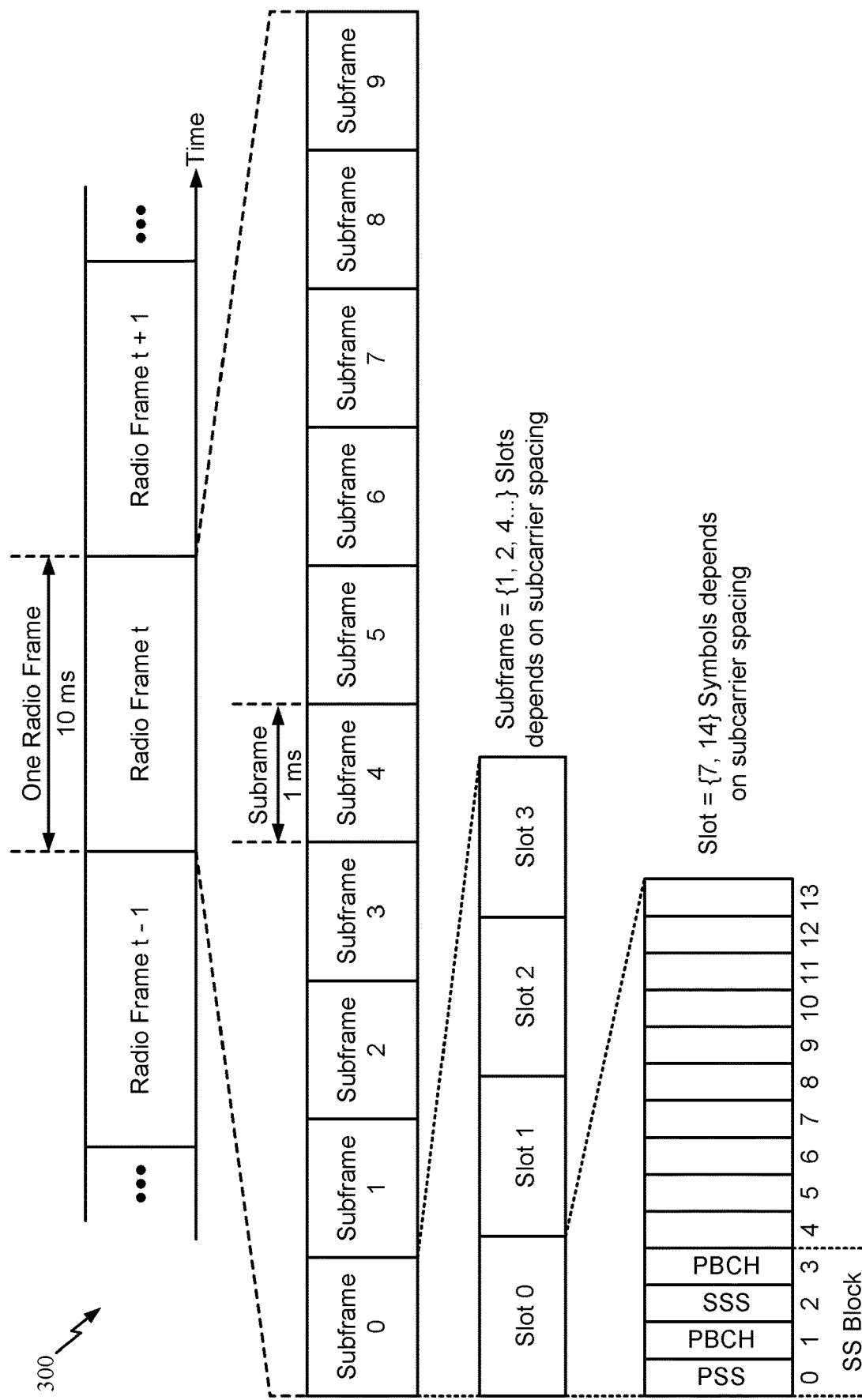
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example TRPs and L1/L2 Inter-Cell Mobility

A wireless communication system may include transmission and reception points (TRPs), which may be present in one or more cells. The one or more cells may be managed by one or more base stations (BSs). The TRPs may include large area TRPs and small area TRPs. The large area TRPs may form a large transmission coverage using a high transmission power. The small area TRPs may form a smaller transmission coverage than the large area TRPs using a lower transmission power than the large area TRPs.

Figure 4:
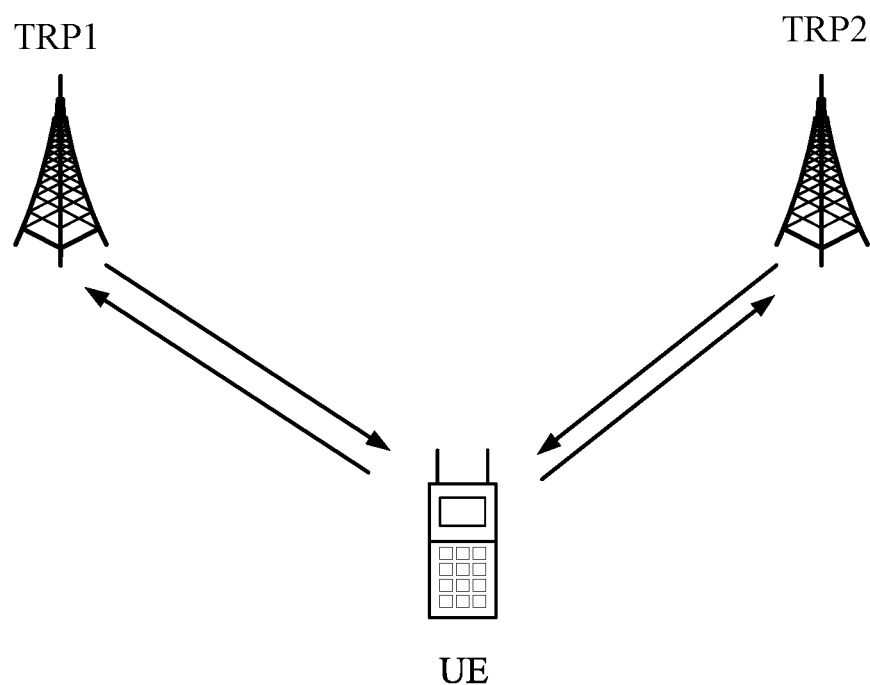
FIG. 4 is a diagram illustrating an example multiple transmission and reception points (TRPs) transmission scenario, in accordance with certain aspects of the present disclosure.

The wireless communication system may include clusters of multiple TRPs to serve user equipments (UEs) to improve link reliability and capacity performance. For example, as illustrated in FIG. 4, a UE is served by a cluster of TRPs (such as TRP 1 and TRP 2) at any given time to support increased mobile data traffic and enhance coverage. The clustering of TRPs may dynamically change over time to adapt to varying radio conditions, spectrum utilization, and UE-mobility. The UE may be served by different clusters of TRPs at different time periods. The different serving TRP clusters may have different number of TRPs associated with same or different cells. These TRPs may implement one or more macro-cells, small cells, pico-cells, or femto-cells, and may include remote radio heads, and relay nodes.

In multi-beam operation (e.g., involving frequency range 1 (FR1) and FR2 bands), more efficient uplink (UL)/downlink (DL) beam management may allow for increased intra-cell and inter-cell mobility (e.g., L1 and/or L2-centric mobility) and/or a larger number of transmission configuration indicator (TCI) states. For example, the TCI states may include the use of a common beam for data and control transmission and reception for UL and DL operations, a unified TCI framework for UL and DL beam indication, and enhanced signaling mechanisms to improve latency and efficiency (e.g., dynamic usage of control signaling).

Some features may facilitate UL beam selection for UEs equipped with multiple panels. For example, UL beam selection may be facilitated through UL beam indication based on a unified TCI framework, enabling simultaneous transmission across multiple panels, and enabling fast panel selection. Further, UE-initiated or L1-event-driven beam management may also reduce latency and a probability that beam failure events occur.

Additional enhancements for multi-TRP deployment may target both FR1 and FR2 bands. These enhancements may improve reliability and robustness for channels other than a physical downlink shared channel (PDSCH) (e.g., a physical downlink control channel (PDCCH), a physical uplink shared channel (PUSCH), and a physical uplink control channel (PUCCH)) using multi-TRP and/or multi-panel operations. These enhancements may, in some cases, be related to quasi co-location (QCL) and TCI that may enable inter-cell multi-TRP operations and may allow for simultaneous multi-TRP transmission with multi-panel reception, assuming multi-downlink control information (DCI)-based multi-PDSCH reception.

Still further enhancements may support single frequency networks (SFNs) in high speed environments (e.g., in the high speed train (HST) scenario). These may include QCL assumptions for demodulation reference signals (DMRS), such as multiple QCL assumptions for the same DMRS ports and/or targeting DL-only transmission. In some cases, the enhancements may specify a QCL or QCL-like relation, including applicable QCL types and associated requirements, between DL and UL signals by using a unified TCI framework.

In Rel-15 and Rel-16, each serving cell may have one radio resource control (RRC)-configured serving cell ID (e.g., ServCellIndex and/or SCellIndex parameter) and one RRC-configured physical cell indicator (PCI) (e.g., PhysCellId parameter). A UE may also acquire a physical cell identifier from a synchronization signal block (SSB) of the serving cell.

To enable L1 (e.g., a physical layer)/L2 (e.g., a medium access control (MAC) layer) based inter-cell mobility, a BS may need to know whether a UE supports L1/L2 mobility. L1/L2 based inter-cell mobility may include various operating modes. In a first operating mode, each serving cell can have a PCI and multiple physical cell sites (e.g., remote radio headers (RRHs)). Each RRH may transmit a different set of SSB IDs using the same PCI. A DCI or medium access control-control element (MAC-CE) may select which RRH or corresponding SSB to serve the UE based on signal strength metrics (e.g., reference signal received power (RSRP) per reported SSB ID.

In another operating mode, each serving cell may be configured with multiple PCIs. Each RRH of the serving cell can use one of the multiple PCIs configured for the serving cell and can transmit the full set of SSB IDs configured for the cell. A DCI or MAC-CE can select which RRH(s) or corresponding PCI(s) and/or SSB(s) to serve the UE based on signal strength metrics (e.g., RSRP) per reported SSB ID per reported PCI.

In still another operating mode, each serving cell may be configured with a single PCI. A DCI or MAC-CE can identify serving cell(s) or corresponding serving cell ID(s) to serve the UE based on signal strength metrics (e.g., RSRP) pre reported SSB ID per reported PCI.

While the above refers to selection or use of SSBs, it should be understood that other cell-identifying reference signals may be used to identify a serving cell to serve a UE. For example, channel state information (CSI) reference signals (CSI-RSs) or positioning reference signals (PRSs) can be used to identify the serving cell(s) to serve the UE.

Example Machine Learning

Aspects of the present disclosure relate to machine learning model sharing between wireless nodes. As mentioned above, machine learning may be used for various wireless communication applications, which may be related to L1/L2 mobility.

In some examples, machine learning involves training a model, such as a predictive model. The model may be used to predict best actions based on a current state. The model may be used to perform the prediction(s) discussed above and/or other factors. The model may be trained based on training data (e.g., training information), which may include channel conditions parameters, states, actions, and associated rewards. The model may be trained and/or refined on-line. For example, environmental change can motivate on-line training to fine tune a machine learning mode. Various training samples across nodes may be used in a single link or multi-link system.

A networked environment may include a user equipment (UE), a base station (BS), a training system, and a training repository, communicatively connected via a network(s). The network(s) may include a wireless network, which may be a 5th generation (5G) new radio (NR) network and/or a long term evolution (LTE) network. The training system and the training repository may be implemented on the UE, the BS, as separate components, and/or on any number of computing systems, either as one or more standalone systems or in a distributed environment.

The training system includes a predictive model training manager that uses training data to generate the predictive model for data transmission configuration. The predictive model may be determined based, at least in part, on the information in the training repository.

The machine learning model may be trained in a simulated communication environment (e.g., in field testing, drive testing) prior to deployment. The training information can be stored in the training repository. After deployment, the training repository can be updated to include feedback associated with the machine learning model. The training repository can be updated with information from BSs and/or UEs in the environment, for example, based on learned experience by those BSs and UEs.

The predictive model training manager may use the information in the training repository to determine the predictive model (e.g., algorithm) used for determining a data transmission configuration. The predictive model training manager may use various different types of machine learning algorithms to form the predictive model. The training repository may be a storage device, such as a memory. The training repository may be in cloud storage.

The machine learning may use any appropriate machine learning algorithm. In some non-limiting examples, the machine learning algorithm is a reinforcement learning algorithm, a value reinforcement algorithm, a supervised learning algorithm, an unsupervised learning algorithm, a deep learning algorithm, an artificial neural network algorithm, a Q-learning algorithm, a polar reinforcement algorithm, or other type of machine learning algorithm.

In some examples, the machine learning (e.g., used by the training system) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the BS's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the training system), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, the training system generates vectors from the information in the training repository. In some examples, the training repository stores vectors. In some examples, the vectors map one or more features to a label. For example, the features may correspond to various one or more actions for a data transmission configuration and/or various states. The label may correspond to various predicted outcomes for those actions and states. The predictive model training manager may use the vectors to train the predictive model. As discussed above, the vectors may be associated with weights in the machine learning algorithm.

In some examples, reinforcement learning is modeled as a Markov Decision Process (MDP). A MDP is a discrete, time stochastic, control process. The MDP provides a mathematical framework for modeling decision making in situations where outcomes may be partly random and partly under the control of a decision maker. In MDP, at each time step, the process is in a state, of a set of S finite states, and the decision maker may choose any action, of a finite set of actions A, that is available in that state. The process responds at the next time step by randomly moving into a new state, and giving the decision maker a corresponding reward, where $R_\alpha(s,s')$ is the immediate reward (or expected immediate reward) after transitioning from state s to state s'. The probability that the process moves into its new state is influenced by the chosen action, for example, according to a state transition function. The state transition may be given by $P_\alpha(s,s')=Pr\ (s_{t+1}=s'|s_t=s,\ \alpha_t=\alpha)$.

An MDP seeks to find a policy for the decision: a function of π that specifies the action π(s) that the decision maker will choose when in state s. The goal is to choose a policy π that maximizes the rewards. For example, a policy that maximizes a cumulative function of the rewards, such as a discounted summation. The following shows an example function:

$$\Sigma_{t=0}^{\infty}\gamma^t R_{\alpha_t}(s_t,s_{t+1}),\ \text{where}$$

$\alpha_t=\pi(s_t)$, the action given by the policy, and γ is the discount factor and satisfies $0\leq\gamma\leq 1$.

The solution for the MDP is a policy which describes the best action for each state in the MDP, for example that maximizes the expected discounted reward.

In some examples, a partially observable MDP is used (POMDP). POMDP may be used when the state may not be known when the action is taken, and, therefore, the probabilities and/or rewards may be unknown. For POMDP, reinforcement learning may be used. The following function may be defined:

$$Q(s,a)=\Sigma_{s'}P_\alpha(s,s')(R_\alpha(s,s')+\gamma V(s')),$$

where V(s') is the discounted cumulative reward.

Experience during learning may be based on (s,a) pairs together with the outcome s'. For example, if the node was previously in a state s, and made a base station analog/digital precoders, MCS, RV index, DMRS configuration, resource allocation selection (among other actions) a, and achieved a throughput s'. In this example, the node may update the array Q directly based on the learned experience. This may be referred to as Q-learning. In some examples, the learning algorithm may be continuous.

The framework of reinforcement learning provides the tools to optimally solve the POMDP. The learning changes the weights of the multi-level perceptron (e.g., the neural net) that decides on the next action to take. The algorithm in deep machine learning is encoded in the neural net weights. Thus, changing the weights changes the algorithm.

In some examples, the machine learning-based data transmission configuration uses a deep learning algorithm. The deep learning algorithm may be a deep Q network (DQN) algorithm implemented by a neural network.

In some examples, the machine learning algorithm is modeled as a POMDP with reinforcement learning. A POMDP can be used when the state may not be known when the action is taken, and, therefore, the probabilities and/or rewards may be unknown. For POMDP, reinforcement learning may be used. The Q array may be defined as:

$$Q_{i+1}(s,a)=E\{r+\gamma\ \max\ Q_i(s',a')|s,a\}.$$

According to certain aspects, the machine learning-based data transmission configuration allows for continuous infinite learning. In some examples, the learning may be augmented with federated learning. For example, while some machine learning approaches use a centralized training data on a single machine or in a data center; with federated learning, the learning may be collaborative involving multiple devices to form the predictive model. With federated learning, training of the model can be done on the device, with collaborative learning from multiple devices.

Example Machine Learning Model Sharing Between Wireless Nodes

Aspects of the present disclosure relate to wireless communications and, more particularly, to techniques for machine learning model sharing between wireless nodes. The machine learning model sharing may help transfer learning.

User equipments (UEs) are classified into various groups for the purpose of machine learning models. The UEs in a group may share one or more similar characteristics (e.g., the UEs are in a similar network environment). Machine learning model sharing may be useful for the UEs in the group that are in the similar network environment. For example, the UEs in the group may update (e.g., modify, replace, and/or add to) their machine learning models based on the machine learning model sharing.

Machine learning model sharing may be bilateral (and/or network assisted). In bilateral sharing, a UE can share machine learning models with the network. For example, the UE may train a machine learning model and share it with a base station (BS). The BS can then share the machine learning model with other UEs. The UEs, therefore, can receive machine learning models from the network that were uploaded earlier by other UEs. The machine learning model sharing may be self-discovery based.

In some systems, machine learning model sharing is between a UE and its serving cell (e.g., a serving transmission reception point (TRP)). In some cases, such as with inter-cell L1 (layer 1)/L2 (layer 2) mobility, the serving TRP changes dynamically over time. Accordingly, the UE may be connected with multiple TRPs with same or different cell identifier (IDs). Aspects of the present disclosure provide machine learning model sharing that can be used in inter-cell mobility scenarios.

Certain aspects provide for sharing of TRP-specific machine learning models and information regarding which machine learning models are applicable for which TRPs between wireless nodes. For example, a machine learning model may be generated as a function of a UE-TRP pair. The machine learning model(s) sharing, from a UE and/or a BS, may include corresponding TRP indexes indicating the TRP to which the respective machine learning model is applicable. Accordingly, as the UE moves and the serving cell changes, the UE can determine and use the appropriate machine learning model for that serving cell. For example, the BS may notify the UE to switch the machine learning model (e.g., to disable a current machine learning model and enable the applicable machine learning model) or the UE can determine to switch the machine learning model. The UE can switch to the machine learning model associated with the current serving cell TRP index. The switching of the machine learning model may also be based on whether the machine learning model for the current serving cell is sufficiently trained.

Certain aspects provide for a joint machine learning model that may be used across all TRPs within a cell. For example, the joint machine learning model may not be generated as a function of a UE-TRP pair. The joint machine learning model does not need to be switched as the UE's serving cell (e.g., serving TRP) dynamically changes over time, because the joint machine learning model may be used for any TRP in the cell. In some cases, an indication may be sent indicating that a machine learning model can be used for any/all TRPs in the cell. In certain aspects, the joint machine learning model may be used across a subset of TRPs within a cell. Accordingly, as the serving TRP switches, the UE may switch the machine learning model for some serving TRPs but can use the same machine learning model, and not switch, for serving TRPs to which the joint machine learning model is applicable. In this case, the indication may be sent indicating the subset of TRPs to which the joint machine learning model is applicable.

According to certain aspects, machine learning models may be shared via inter-cell mobility signaling such as physical layer (PHY) or medium access control (MAC) layer signaling. A UE may determine a machine learning model that is applicable for a serving TRP associated with a cell managed by a BS, and then execute the determined machine learning model for one or more wireless communication applications. Example of such wireless communication applications include a channel state information (CSI) compression, a cross frequency channel prediction, beam management (e.g., a beam selection), etc.

The techniques presented herein may be applied in various bands utilized for new radio (NR). For example, for the higher band referred to as FR4 (e.g., 52.6 GHz-114.25 GHz), an orthogonal frequency-division multiplexing (OFDM) waveform with very large subcarrier spacing (e.g., 960 kHz-3.84 MHz) may be used combat phase noise. Due to the large subcarrier spacing (SCS), the slot length tends to be very short (e.g., 15.6 Sec for 960 kHz SCS). In a lower band referred to as FR2 (e.g., 24.25 GHz to 52.6 GHz), the slot length is longer (e.g., 25 Sec for 120 kHz SCS).

Figure 5:
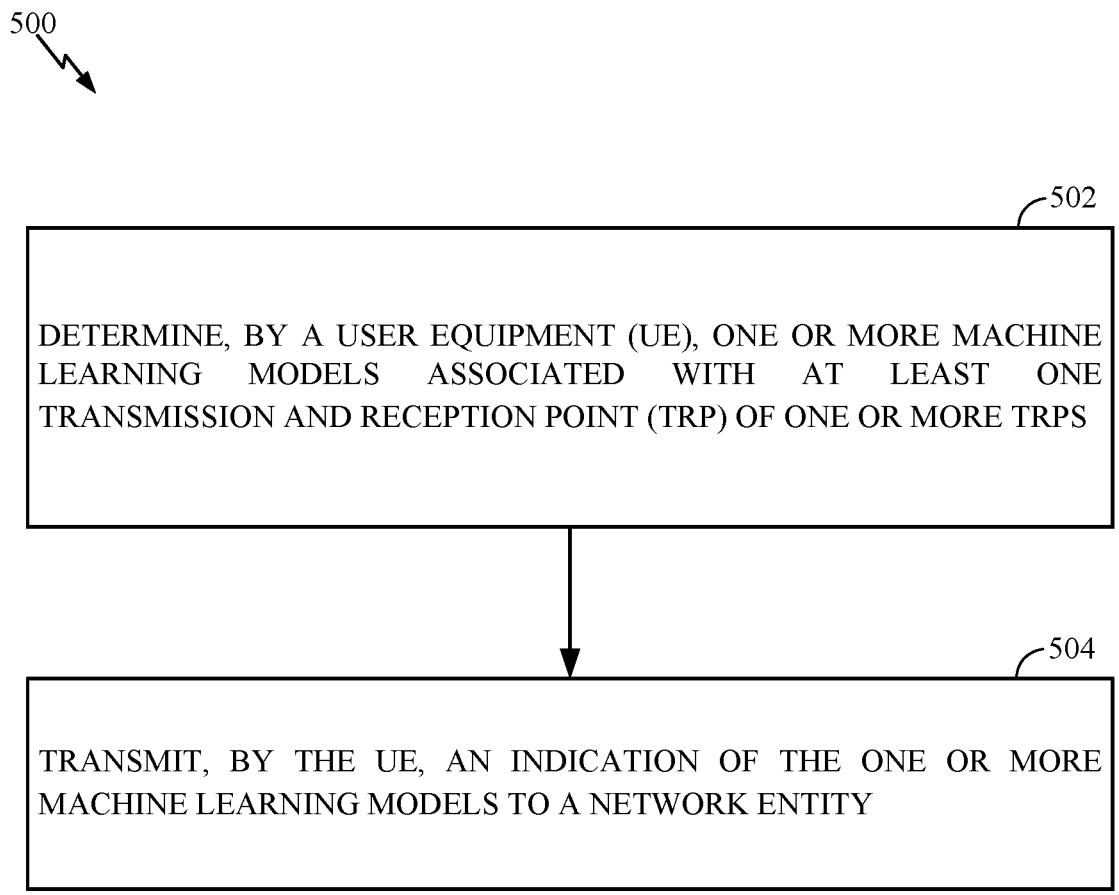
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. The operations 500 may be performed, for example, by the UE 120a in the wireless communication network 100. The operations 500 may be implemented as software components that are executed and run on one or more processors (e.g., the controller/processor 280 of FIG. 2). Further, the transmission and reception of signals by the UE in operations 500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 500 begin, at 502, by determining one or more machine learning models associated with at least one TRP of one or more TRPs. For example, the UE may determine the one or more machine learning models associated with the at least one TRP of the one or more TRPs using a processor, antenna(s) and/or transceiver components of the UE 120a shown in FIG. 1 or FIG. 2 and/or of the apparatus shown in FIG. 12.

At 504, the UE transmits an indication of the one or more machine learning models to a network entity. For example, the UE may transmit the indication of the one or more machine learning models to the network entity using antenna(s) and transmitter/transceiver components of the UE 120a shown in FIG. 1 or FIG. 2 and/or of the apparatus shown in FIG. 12.

Figure 6:
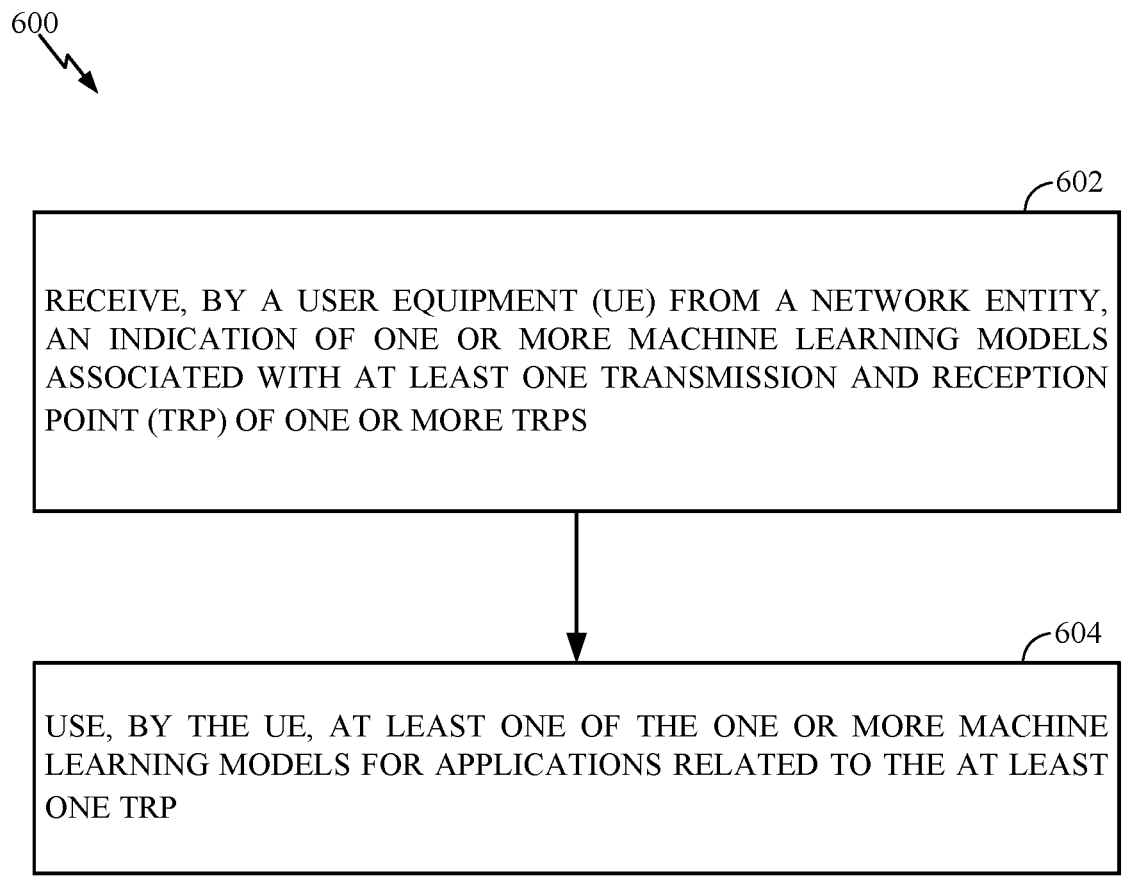
FIG. 6 is a flow diagram illustrating example operations for wireless communication by a UE, in accordance with certain aspects of the present disclosure.

FIG. 6 is a flow diagram illustrating example operations 600 for wireless communication by a UE, in accordance with certain aspects of the present disclosure. The operations 600 may be performed, for example, by the UE 120a in the wireless communication network 100. The operations 600 may be implemented as software components that are executed and run on one or more processors (e.g., the controller/processor 280 of FIG. 2). Further, the transmission and reception of signals by the UE in operations 600 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 600 begin, at 602, by receiving, from a network entity, an indication of one or more machine learning models associated with at least one TRP of one or more TRPs. For example, the UE may receive the indication from the network entity using antenna(s) and/or receiver/transceiver components of the UE 120a shown in FIG. 1 or FIG. 2 and/or of the apparatus shown in FIG. 13.

At 604, the UE uses at least one of the one or more machine learning models for applications related to the at least one TRP. For example, the UE may use at least one of the one or more machine learning models for applications related to the at least one TRP using a processor, antenna(s) and/or transceiver components of the UE 120a shown in FIG. 1 or FIG. 2 and/or of the apparatus shown in FIG. 13.

Figure 7:
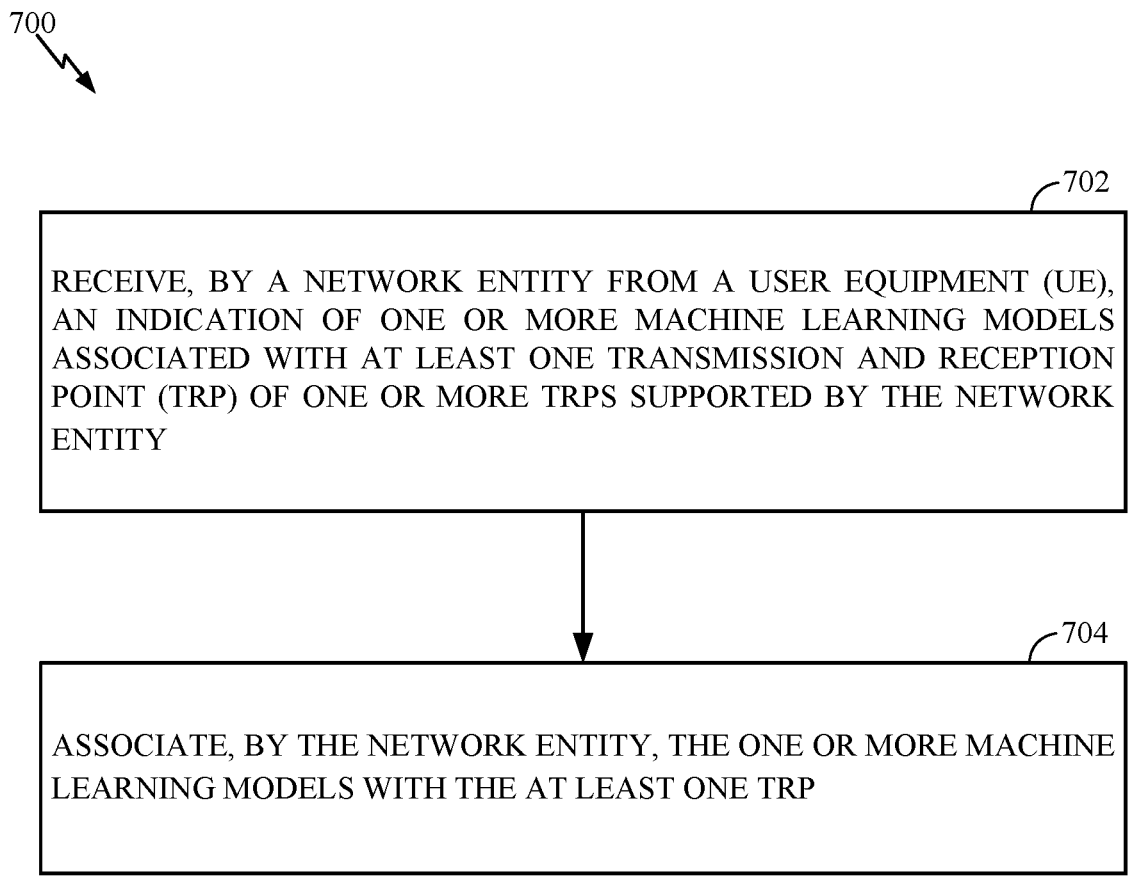
FIG. 7 is a flow diagram illustrating example operations for wireless communication by a network entity, in accordance with certain aspects of the present disclosure.

FIG. 7 is a flow diagram illustrating example operations 700 for wireless communication by a network entity, in accordance with certain aspects of the present disclosure. The operations 700 may be performed, for example, by a network entity (e.g., such as the BS 110a in the wireless communication network 100). The operations 700 may be implemented as software components that are executed and run on one or more processors (e.g., the controller/processor 240 of FIG. 2). Further, the transmission and reception of signals by the network entity in operations 700 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 700 begin, at 702, by receiving, from a UE, an indication of one or more machine learning models associated with at least one TRP of one or more TRPs supported by the network entity. For example, the network entity may receive the indication from the UE using antenna(s) and receiver/transceiver components of the BS 110a shown in FIG. 1 or FIG. 2 and/or of the apparatus shown in FIG. 14.

At 704, the network entity associates the one or more machine learning models with the at least one TRP. For example, the network entity may associate the one or more machine learning models with the at least one TRP using a processor, antenna(s) and/or transceiver components of the BS 110a shown in FIG. 1 or FIG. 2 and/or of the apparatus shown in FIG. 14.

Figure 8:
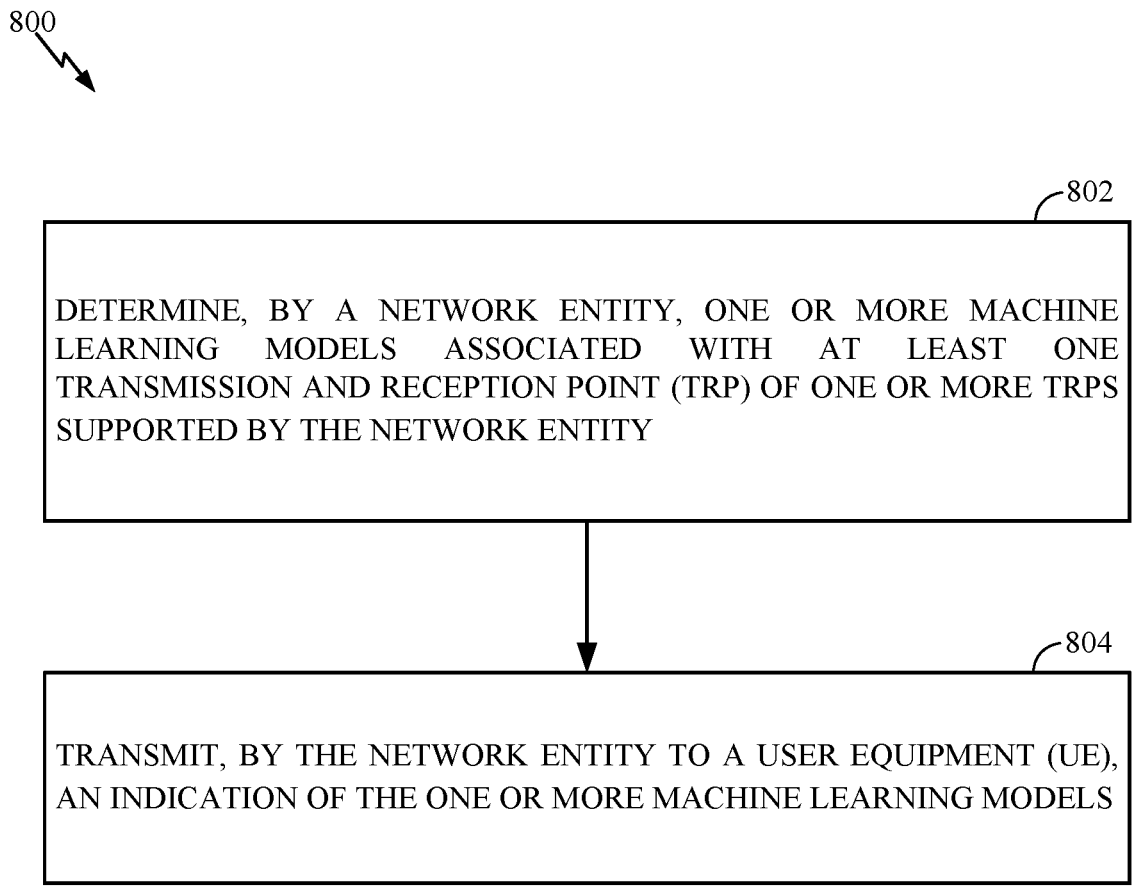
FIG. 8 is a flow diagram illustrating example operations for wireless communication by a network entity, in accordance with certain aspects of the present disclosure.

FIG. 8 is a flow diagram illustrating example operations 800 for wireless communication by a network entity, in accordance with certain aspects of the present disclosure. The operations 800 may be performed, for example, by a network entity (e.g., such as the BS 110a in the wireless communication network 100). The operations 800 may be implemented as software components that are executed and run on one or more processors (e.g., the controller/processor 240 of FIG. 2). Further, the transmission and reception of signals by the network entity in operations 800 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 800 begin, at 802, by determining one or more machine learning models associated with at least one TRP of one or more TRPs supported by the network entity. For example, the network entity may determine the one or more machine learning models associated with the at least one TRP of the one or more TRPs using a processor, antenna(s) and/or transceiver components of the BS 110a shown in FIG. 1 or FIG. 2 and/or of the apparatus shown in FIG. 15.

At 804, the network entity transmits, to a UE, an indication of the one or more machine learning models. For example, the network entity may transmit the indication to the UE using antenna(s) and transmitter/transceiver components of the BS 110a shown in FIG. 1 or FIG. 2 and/or of the apparatus shown in FIG. 15.

Figure 9:
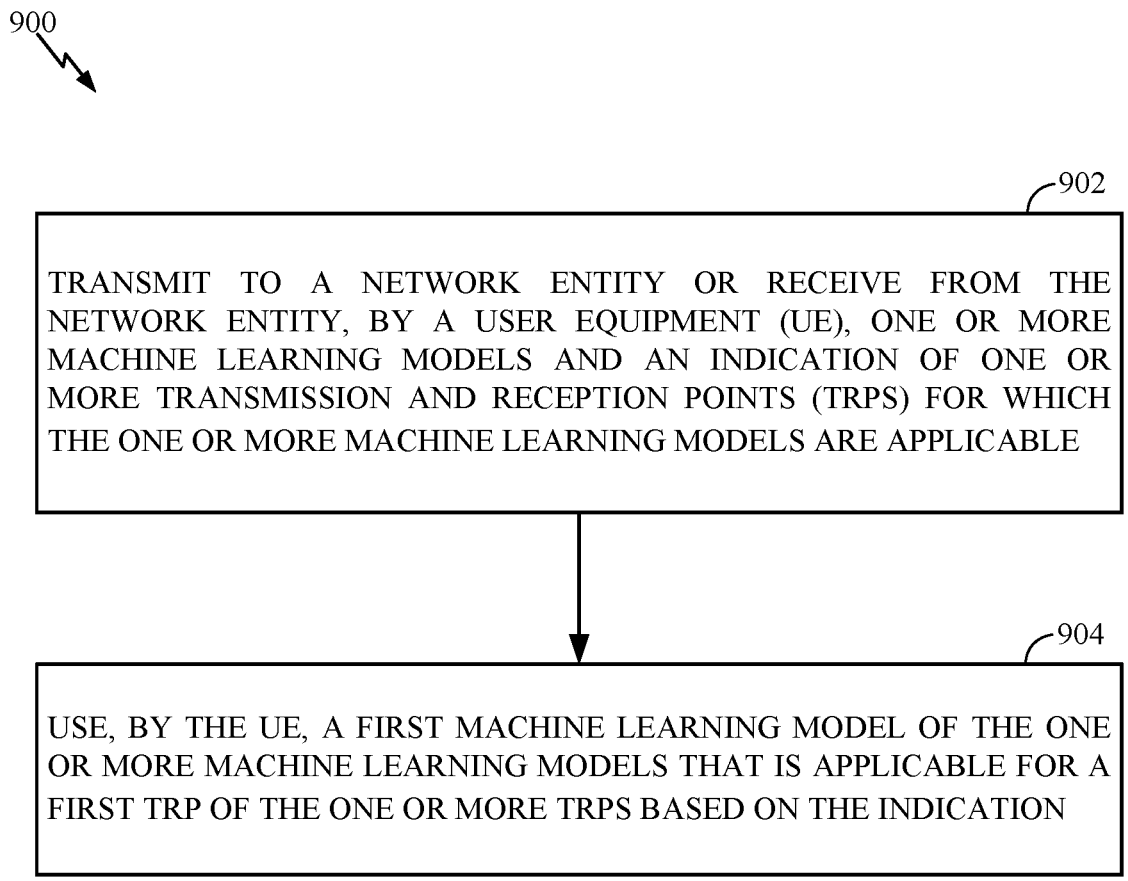
FIG. 9 is a flow diagram illustrating example operations for wireless communication by a UE, in accordance with certain aspects of the present disclosure.

FIG. 9 is a flow diagram illustrating example operations 900 for wireless communication. Operations 900 may be performed by a UE (e.g., such as the UE 120a in FIG. 1 or FIG. 2) to share TRP-specific machine learning models with other UEs and BSs, in accordance with aspects of the present disclosure.

Operations 900 begin, at 902, by transmitting to a network entity, or receiving from the network entity, one or more machine learning models and an indication of one or more TRPs for which the one or more machine learning models are applicable. The UE may transmit to and/or receive from the network entity and/or other UEs using antenna(s) and transceiver components of the UE 120a shown in FIG. 1 or FIG. 2 and/or of the apparatus shown in FIG. 16.

In certain aspects, the UE receives from other UEs these one or more machine learning models and the indication of the one or more TRPs for which the one or more machine learning models are applicable.

In certain aspects, the UE receives from the network entity the one or more machine learning models and the indication of the one or more TRPs for which the one or more machine learning models are applicable.

In certain aspects, the UE generates the one or more machine learning models and the indication of the one or more TRPs for which the one or more machine learning models are applicable. The one or more TRPs may be associated with a cell to which the UE is communicatively coupled.

In certain aspects, the indication may indicate a single TRP for which each of the one or more machine learning models is applicable. The one or more machine learning models may include a first machine learning model and a second machine learning model. For example, the first machine learning model is applicable for a first TRP of the one or more TRPs, and the second machine learning model is applicable for a second TRP of the one or more TRPs. The first TRP is the single TRP. Also, the second TRP is the single TRP.

In certain aspects, the indication may indicate, for each of the one or more machine learning models, a TRP index for which a corresponding machine learning model is applicable. For example, the TRP index may indicate that the first machine learning model is applicable for the first TRP, and the second machine learning model is applicable for the second TRP.

In certain aspects, the indication may indicate that the one or more machine learning models are applicable to all of the one or more TRPs. For example, a single machine learning model is applicable for all TRPs (e.g., a first TRP and a second TRP).

In certain aspects, the indication may indicate that each of the one or more machine learning models is applicable to a subset of the one or more TRPs. The one or more TRPs may include a first TRP, a second TRP, a third TRP, and a fourth TRP. For example, a first machine learning model is applicable for the first TRP and the second TRP of the one or more TRPs, and a second machine learning model is applicable for the third TRP and the fourth TRP of the one or more TRPs.

At 904, the UE uses a first machine learning model of the one or more machine learning models that is applicable for a first TRP of the one or more TRPs based on the indication. The UE may use (and execute) the first machine learning model using a processor of the UE 120a shown in FIG. 1 or FIG. 2 and/or of the apparatus shown in FIG. 16.

In certain aspects, after the UE determines that the first machine learning model is applicable for the first TRP based on the indication, the UE then determines a training status corresponding to the first machine learning model prior to using the first machine learning model. To determine the training status of the first machine learning model, the UE determines whether the first machine learning model has sufficient training to operate. When the first machine learning model has the sufficient training to operate, the UE enables and uses the first machine learning model applicable for the first TRP. When the first machine learning model does not have the sufficient training to operate, the UE disables the first machine learning model.

In certain aspects, when the indication indicates the single TRP for which each of the one or more machine learning models is applicable, and the UE moves from the first TRP to a next TRP (such as a second TRP), the UE transmits to the network entity a first notification to switch to a second machine learning model that is applicable for the second TRP based on the TRP index. In one example, the first notification is transmitted via a medium access control (MAC) control element (CE). In another example, the first notification is transmitted via an uplink control information (UCI). The UE then disables the first machine learning model and activates the second machine learning model. The UE uses the second machine learning model, which is applicable for the second TRP.

In certain aspects, when the indication indicates the single TRP for which each of the one or more machine learning models is applicable, and the UE moves from the first TRP to the second TRP, the UE receives from the network entity a second notification to switch to the second machine learning model that is applicable for the second TRP based on the TRP index. In one example, the second notification is received via a MAC-CE. In another example, the second notification is received via a downlink control information (DCI). The UE then disables the first machine learning model and activates the second machine learning model. The UE uses the second machine learning model, which is applicable for the second TRP.

In certain aspects, when the indication indicates that the one or more machine learning models are applicable to all of the one or more TRPs, and the UE moves from the first TRP to a next TRP, the UE continues using the first machine learning model, which is applicable for all TRPs.

In certain aspects, when the indication indicates that each of the one or more machine learning models is applicable to a subset of the one or more TRPs, and the UE moves from the first TRP to a next TRP (such as the second TRP), the UE then determines whether to continue using the first machine learning model or to switch to another machine learning model based on whether the second TRP is in a same subset as the first TRP. When the first TRP and the second TRP are in the same subset, the UE may continue using the first machine learning model. When the second TRP is in a different subset than the first TRP, the UE then disables the first machine learning model and switches to a machine learning model applicable for the second serving TRP. The UE determines and activates the machine learning model applicable for the second serving TRP based on the TRP index.

Figure 10:
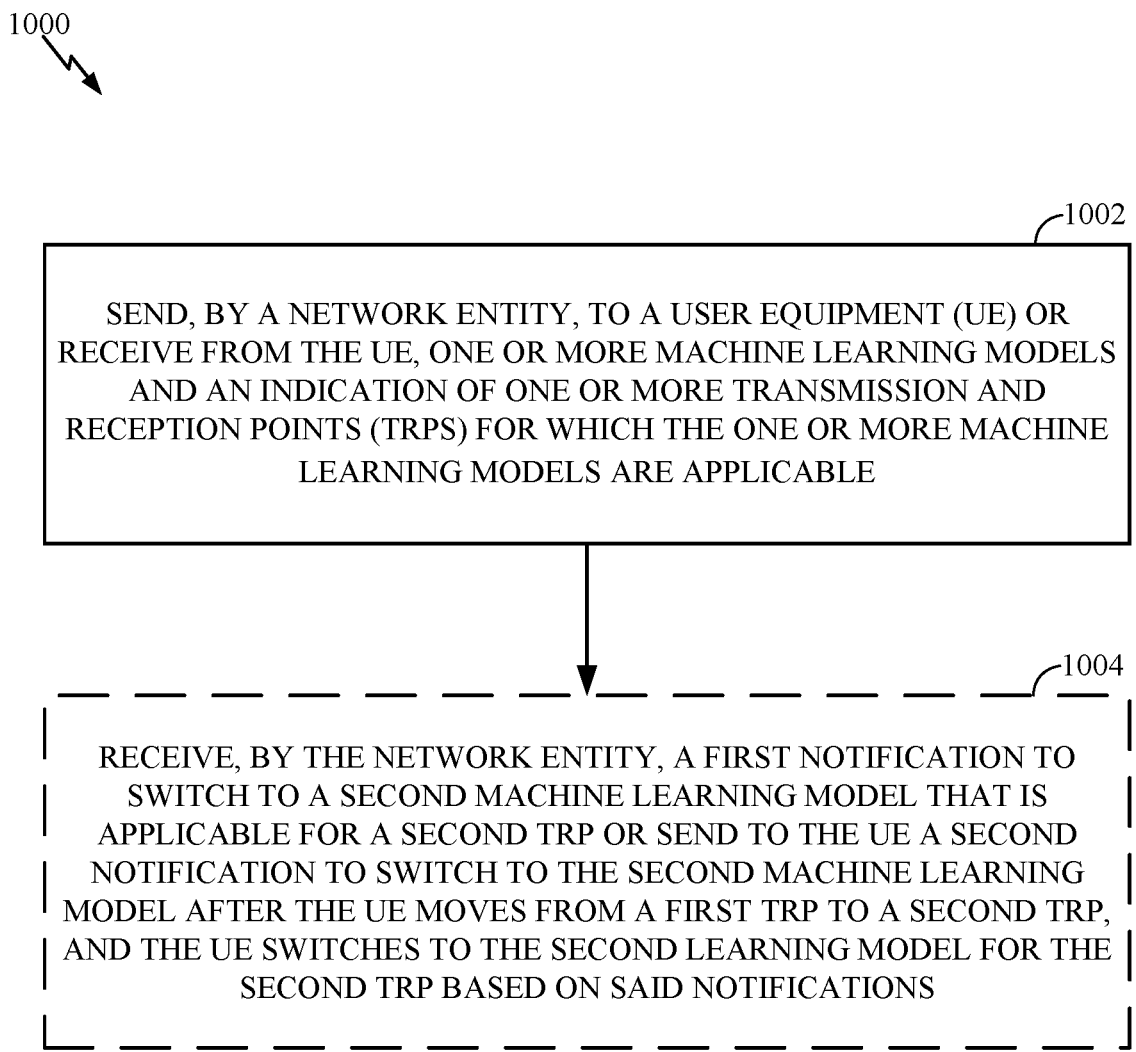
FIG. 10 is a flow diagram illustrating example operations for wireless communication by a network entity, in accordance with certain aspects of the present disclosure.

FIG. 10 is a flow diagram illustrating example operations 1000 for wireless communication by a network entity. For example, operations 1000 may be performed by a network entity (e.g., such as the BS 110a in FIG. 1 or FIG. 2) that share machine learning models with a UE, which enables the UE to perform operations 900 of FIG. 9.

Operations 1000 begin, at 1002, by sending to a UE, or receiving from the UE, one or more machine learning models and an indication of one or more TRPs for which the one or more machine learning models are applicable. The network entity may send to or receives from the UE using antenna(s) and transceiver components of the BS 110a shown in FIG. 1 or FIG. 2 and/or of the apparatus shown in FIG. 17.

In certain aspects, the network entity receives from other UEs these one or more machine learning models and the indication of the one or more TRPs for which the one or more machine learning models are applicable.

In certain aspects, the network entity receives from the UE the one or more machine learning models and the indication of the one or more TRPs for which the one or more machine learning models are applicable.

In certain aspects, the network entity generates and sends to the UE the one or more machine learning models and the indication of the one or more TRPs for which the one more machine learning models are applicable.

In certain aspects, when the UE is associated with a first TRP, the UE uses (and executes) a first machine learning model that is applicable for the first TRP based on the indication indicating a single TRP for which each of the one or more machine learning models is applicable.

Optionally, at 1004, the network entity may receive a notification (e.g., a first notification) from the UE to switch to a second machine learning model that is applicable for a second TRP based on the indication when the UE moves from the first TRP to a second TRP. In certain aspects, the BS sends to the UE a notification (e.g., a second notification) to switch to the second machine learning model when the UE moves from the first TRP to the second TRP. Based on the notifications, the UE disables the first machine learning model and activates the second machine learning model for the second TRP. The UE uses (and executes) the second machine learning model when the UE is associated with the second TRP.

Figure 11:
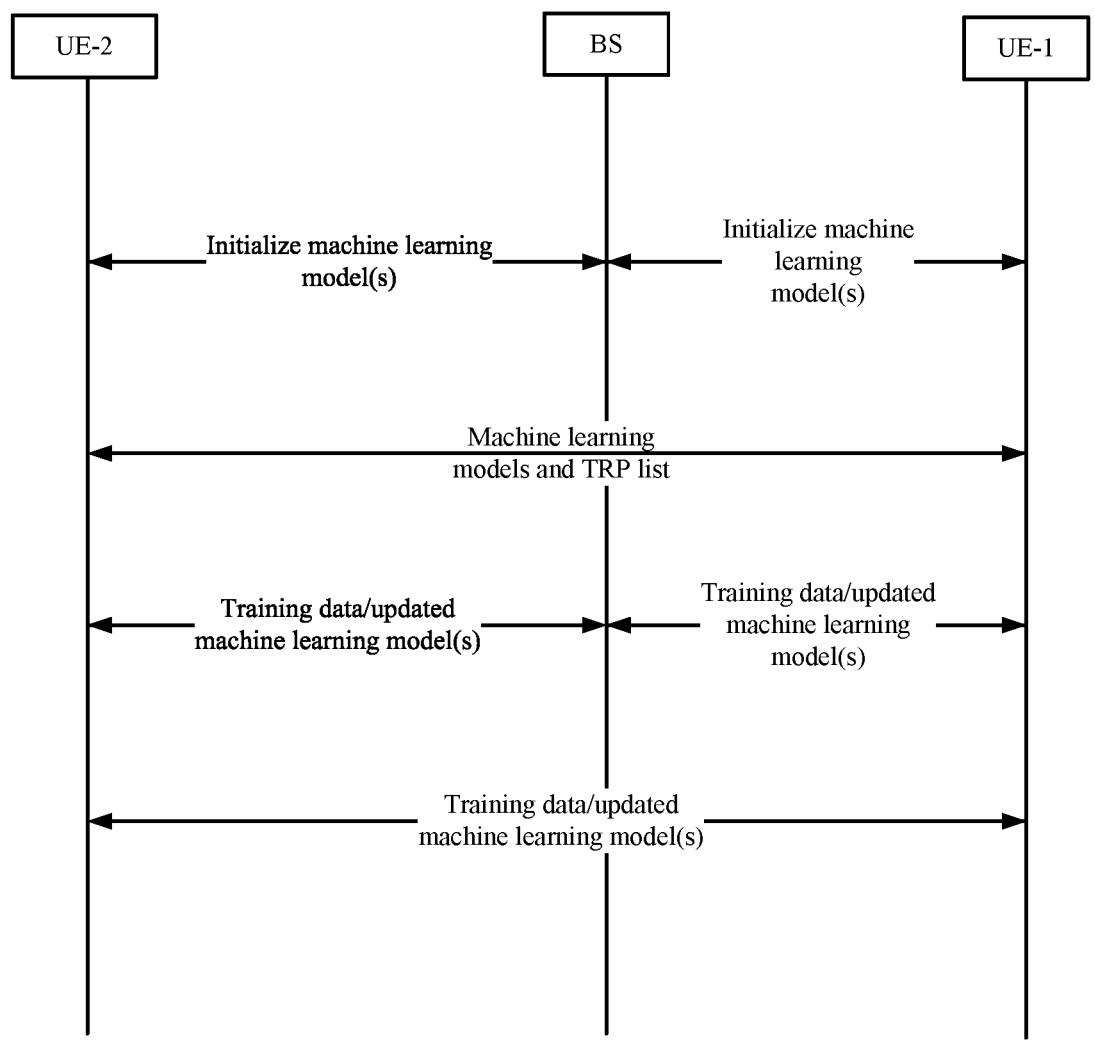
FIG. 11 illustrates a call flow diagram illustrating example signaling between UEs and a BS, in accordance with certain aspects of the present disclosure.

FIG. 11 illustrates a call flow diagram illustrating example signaling between UEs (such as a UE 1 and a UE 2) and a BS for machine learning model training, sharing, and updating.

Initially, machine learning models may be initialized (e.g., trained, generated, configured). In this example shown in FIG. 11, the machine learning models are initialized at the UEs (UE 1 and UE 2).

The BS may determine from a classification list (which may include UEs grouped in different categories for the purpose of TRP-specific machine learning model sharing) whether to share the machine learning models. As shown in FIG. 11, the BS may share the machine learning models between the UE-1 and the UE 2 (e.g., based on the classification list) via one or more communication channels. The BS can also share a TRP list along with the machine learning models between the UE-1 and the UE 2. The TRP list may indicate the TRPs to which the machine learning models are applicable.

In certain aspects, the UE-2 and the UE-1 may train and directly send TRP-specific machine learning models along with the TRP list to each other via sidelink communication channels.

The UEs (or the BS) may send training data (or training dataset) for online training (and fine tuning), and/or updated machine learning model(s), of the TRP-specific learning models to the BS (or the UEs) via one or more communication channels. The BS may share this training data, and/or updated machine learning model(s) with the UEs via the one or more communication channels, which may use this training data to train these machine learning models to enable improved single link and multi-link communications.

In certain aspects, the UE 1 and the UE 2 may directly send training data and/or update machine learning model(s) to each other via sidelink communication channels.

The UEs may apply the appropriate machine learning model (or updated machine learning) based on the current serving TRP. For instance, when there is a change in a serving TRP (e.g., from a first TRP to a second TRP) for the UE 1 (or UE 2), the BS may notify the UE 1 (or UE 2) to disable a previous machine learning model (associated with the first TRP) or enable a new machine learning model (associated with the second TRP).

Example Wireless Communication Devices

Figure 12:
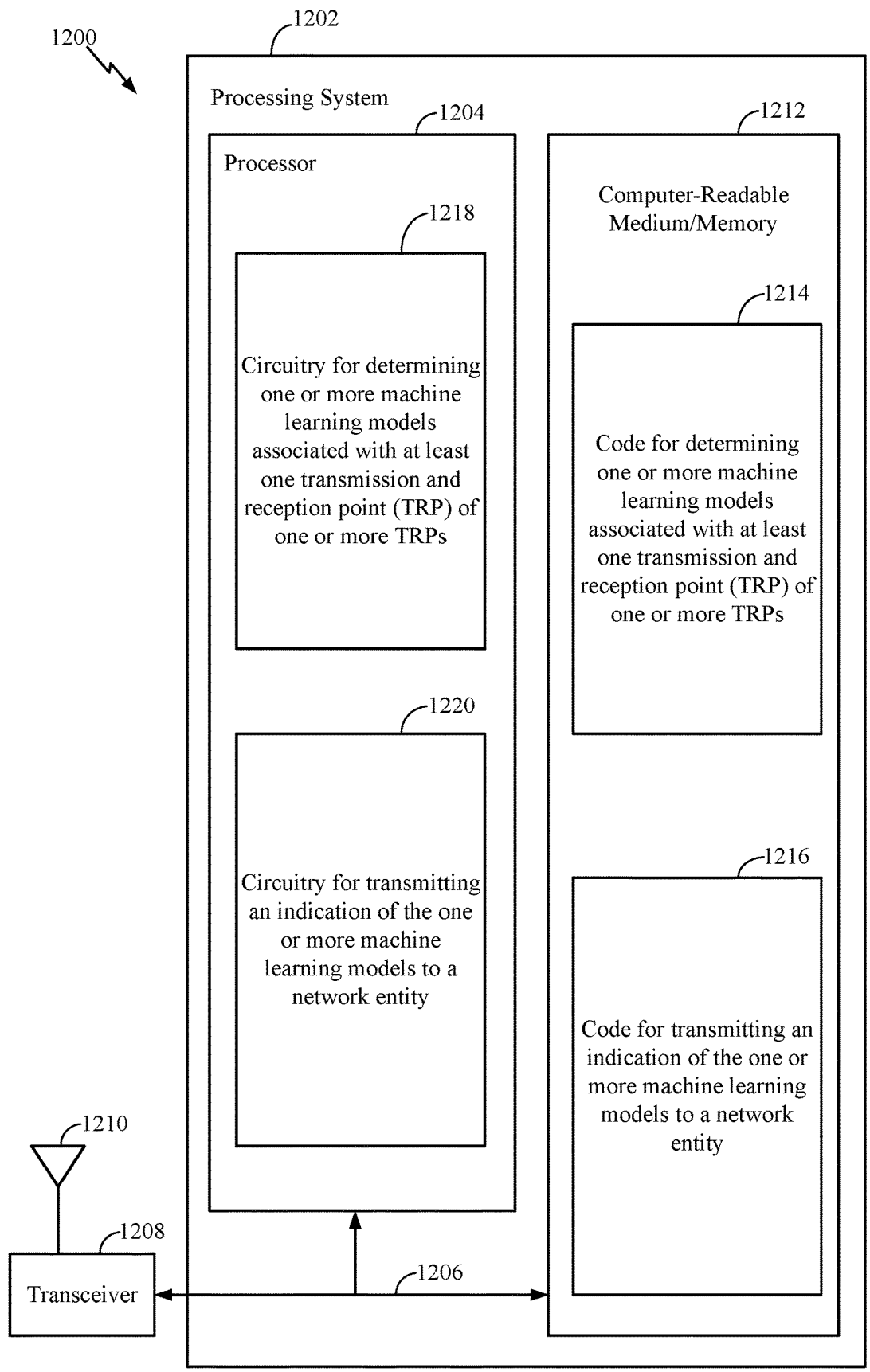
FIGS. 12-17 illustrate a communications device that may include various components configured to perform operations for techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 5. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 5, or other operations for performing the various techniques discussed herein. In certain aspects, computer-readable medium/memory 1212 stores code 1214 for determining and code 1216 for transmitting. The code 1214 for determining may include code for determining one or more machine learning models associated with at least one TRP of one or more TRPs. The code 1216 for transmitting may include code for transmitting an indication of the one or more machine learning models to a network entity.

The processor 1204 may include circuitry configured to implement the code stored in the computer-readable medium/memory 1212, such as for performing the operations illustrated in FIG. 5, as well as other operations for performing the various techniques discussed herein. For example, the processor 1204 includes circuitry 1218 for determining and circuitry 1220 for transmitting. The circuitry 1218 for determining may include circuitry for determining one or more machine learning models associated with at least one TRP of one or more TRPs. The circuitry 1220 for transmitting may include circuitry for transmitting an indication of the one or more machine learning models to a network entity.

Figure 13:
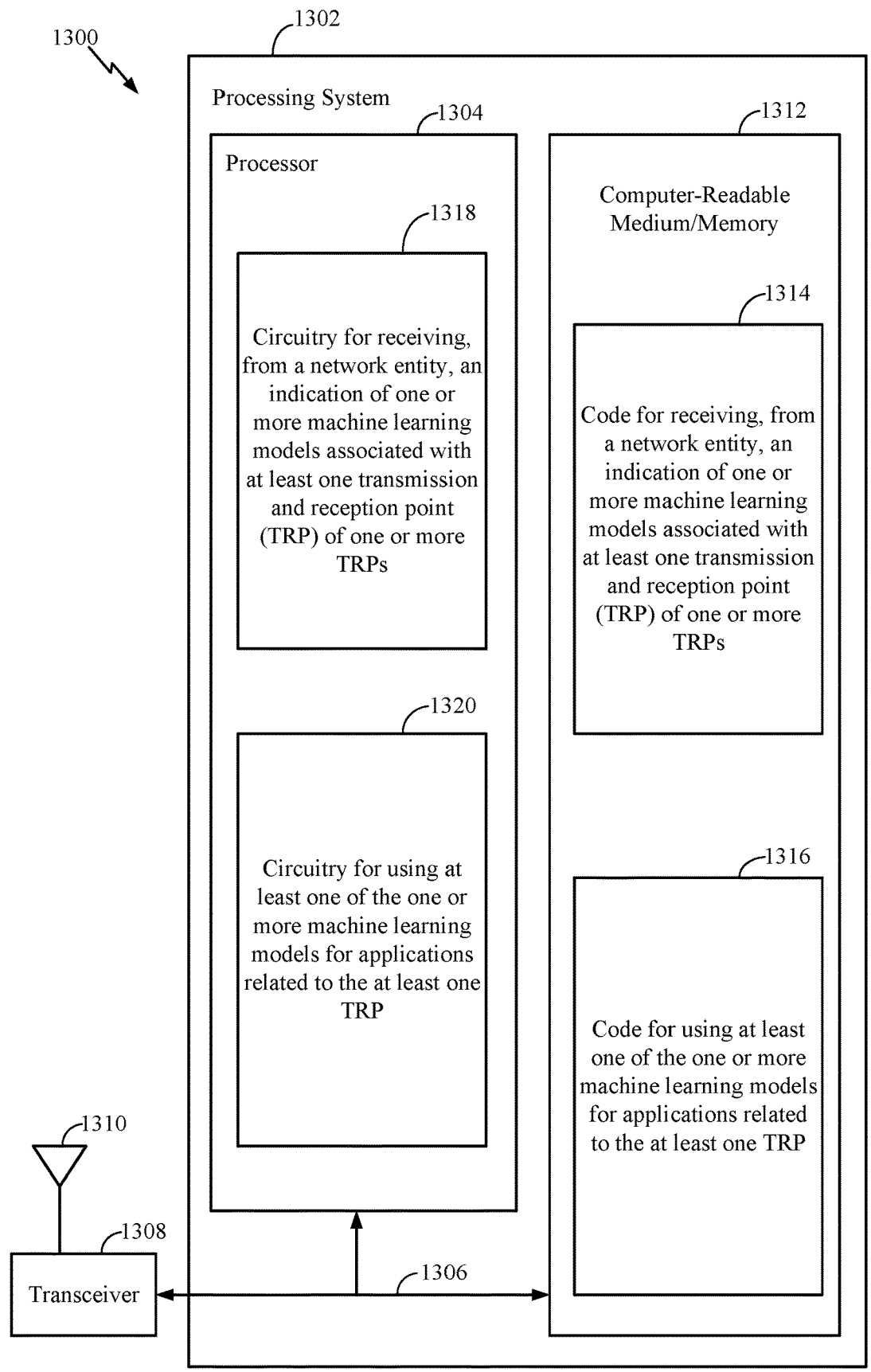

FIG. 13 illustrates a communications device 1300 that may include various components (e.g., corresponding to means-plus-function components) configured to perform operations for the techniques disclosed herein, such as the operations illustrated in FIG. 6. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 is configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., a computer-executable code) that when executed by the processor 1304, cause the processor 1304 to perform the operations illustrated in FIG. 6, or other operations for performing the various techniques discussed herein. In certain aspects, computer-readable medium/memory 1312 stores code 1314 for receiving and code 1316 for using. The code 1314 for receiving may include code for receiving, from a network entity, an indication of one or more machine learning models associated with at least one TRP of one or more TRPs. The code 1316 for using may include code for using at least one of the one or more machine learning models for applications related to the at least one TRP.

The processor 1304 may include circuitry configured to implement the code stored in the computer-readable medium/memory 1312, such as for performing the operations illustrated in FIG. 6, as well as other operations for performing the various techniques discussed herein. For example, the processor 1304 includes circuitry 1318 for receiving and circuitry 1320 for using. The circuitry 1318 for receiving may include circuitry for receiving, from a network entity, an indication of one or more machine learning models associated with at least one TRP of one or more TRPs. The circuitry 1320 for using may include circuitry for using at least one of the one or more machine learning models for applications related to the at least one TRP.

Figure 14:
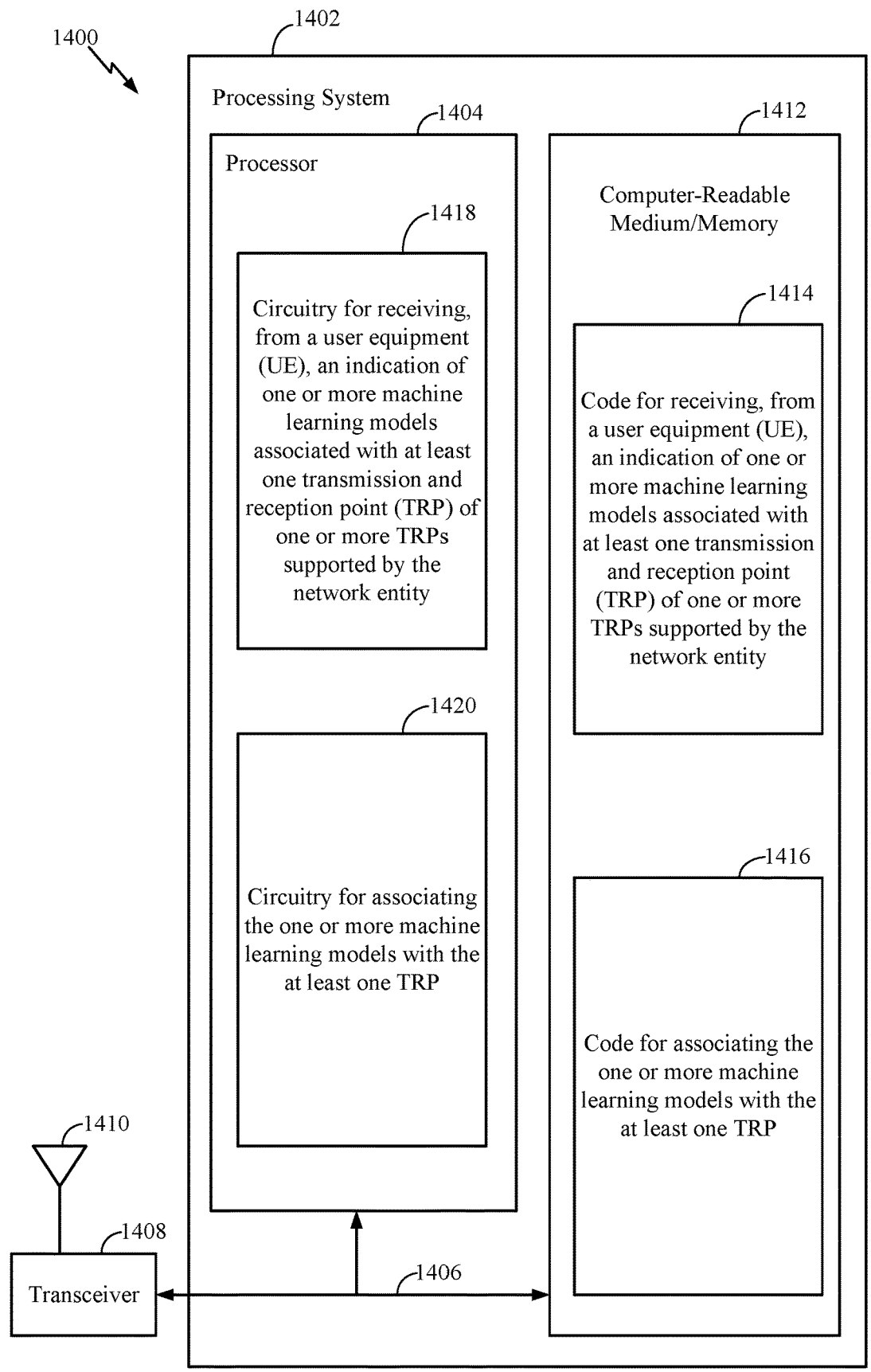

FIG. 14 illustrates a communications device 1400 that may include various components (e.g., corresponding to means-plus-function components) configured to perform operations for the techniques disclosed herein, such as the operations illustrated in FIG. 7. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1212 is configured to store instructions (e.g., a computer-executable code) that when executed by the processor 1404, cause the processor 1404 to perform the operations illustrated in FIG. 7, or other operations for performing the various techniques discussed herein. In certain aspects, computer-readable medium/memory 1412 stores code 1414 for receiving and code 1416 for associating. The code 1414 for receiving may include code for receiving, from a UE, an indication of one or more machine learning models associated with at least one TRP of one or more TRPs supported by the network entity. The code 1416 for associating may include code for associating the one or more machine learning models with the at least one TRP.

The processor 1404 may include circuitry configured to implement the code stored in the computer-readable medium/memory 1412, such as for performing the operations illustrated in FIG. 7, as well as other operations for performing the various techniques discussed herein. For example, the processor 1404 includes circuitry 1418 for receiving and circuitry 1420 for associating. The circuitry 1418 for receiving may include circuitry for receiving, from a UE, an indication of one or more machine learning models associated with at least one TRP of one or more TRPs supported by the network entity. The circuitry 1420 for associating may include circuitry for associating the one or more machine learning models with the at least one TRP.

Figure 15:
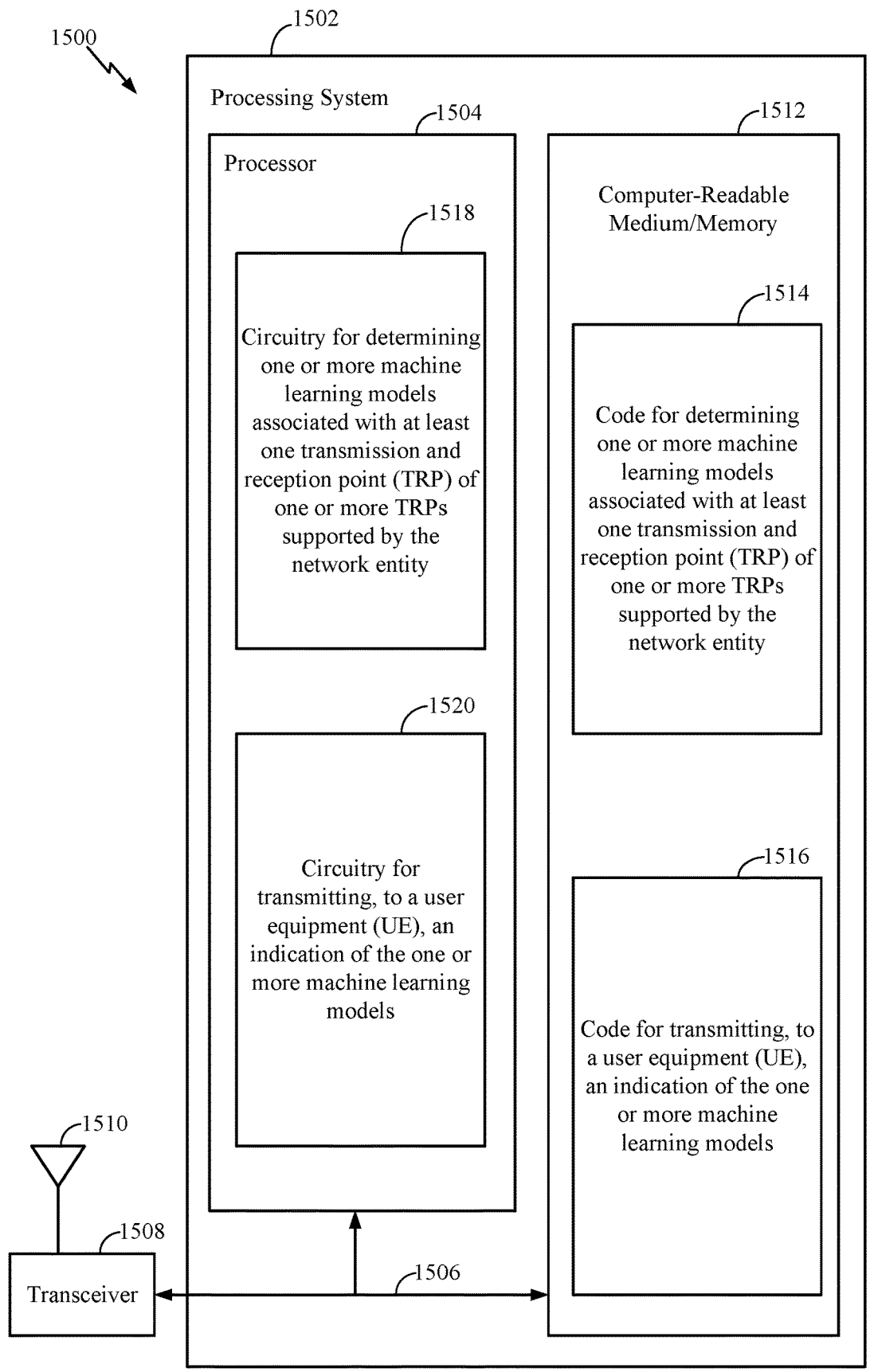

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., a computer-executable code) that when executed by the processor 1504, cause the processor 1504 to perform the operations illustrated in FIG. 8, or other operations for performing the various techniques discussed herein. In certain aspects, computer-readable medium/memory 1512 stores code 1514 for determining and code 1516 for transmitting. The code 1514 for determining may include code for determining one or more machine learning models associated with at least one TRP of one or more TRPs supported by the network entity. The code 1516 for transmitting may include code for transmitting, to a UE, an indication of the one or more machine learning models.

The processor 1504 may include circuitry configured to implement the code stored in the computer-readable medium/memory 1512, such as for performing the operations illustrated in FIG. 8, as well as other operations for performing the various techniques discussed herein. For example, the processor 1504 includes circuitry 1518 for determining and circuitry 1520 for transmitting. The circuitry 1518 for determining may include circuitry for determining one or more machine learning models associated with at least one TRP of one or more TRPs supported by the network entity. The circuitry 1520 for transmitting may include circuitry for transmitting, to a UE, an indication of the one or more machine learning models.

Figure 16:
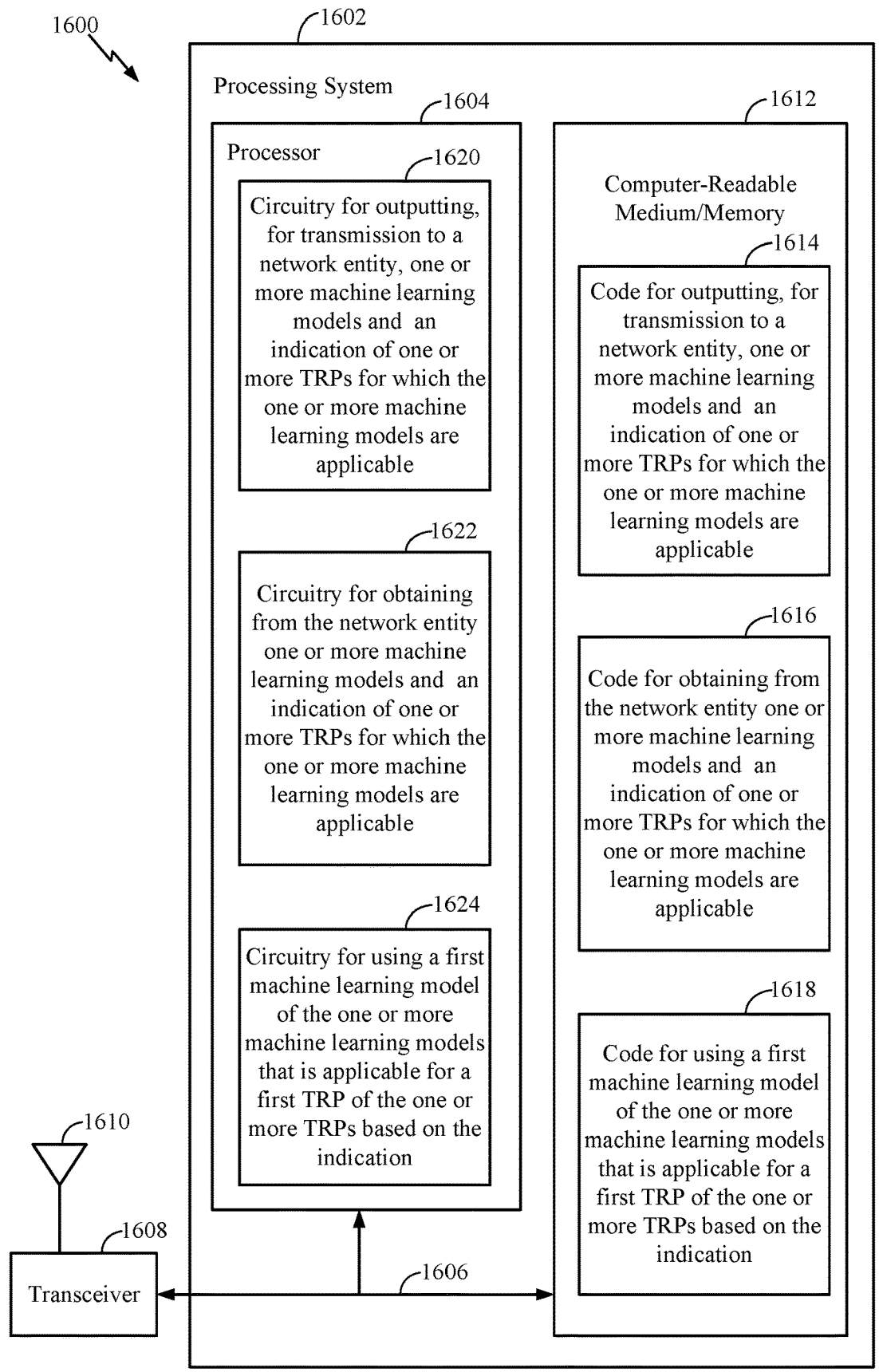

FIG. 16 illustrates a communications device 1600 that may include various components (e.g., corresponding to means-plus-function components) configured to perform operations for techniques disclosed herein, such as the operations illustrated in FIG. 9. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 is configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 9, or other operations for sharing TRP-specific machine learning models between UEs and BSs. In certain aspects, computer-readable medium/memory 1612 stores code 1614 for outputting for transmission, code 1616 for obtaining, and code 1618 for using. The code 1614 for outputting for transmission may include code for outputting for transmission to a network entity one or more machine learning models and an indication of one or more TRPs for which the one or more machine learning models are applicable. The code 1616 for obtaining may include code for obtaining from the network entity one or more machine learning models and an indication of one or more TRPs for which the one or more machine learning models are applicable. The code 1618 for using may include code for using a first machine learning model of the one or more machine learning models that is applicable for a first TRP of the one or more TRPs based on the indication.

The processor 1604 may include circuitry configured to implement the code stored in the computer-readable medium/memory 1612, such as for performing the operations illustrated in FIG. 9, as well as other operations for sharing TRP-specific machine learning models between UEs and BSs. For example, the processor 804 includes circuitry 1620 for outputting for transmission, circuitry 1622 for obtaining, and circuitry 1624 for using. The circuitry 1620 for outputting for transmission may include circuitry for outputting for transmission to a network entity one or more machine learning models and an indication of one or more TRPs for which the one or more machine learning models are applicable. The circuitry 1622 for obtaining may include circuitry for receiving from the network entity one or more machine learning models and an indication of one or more TRPs for which the one or more machine learning models are applicable. The circuitry 1624 for using may include circuitry for using a first machine learning model of the one or more machine learning models that is applicable for a first TRP of the one or more TRPs based on the indication.

Figure 17:
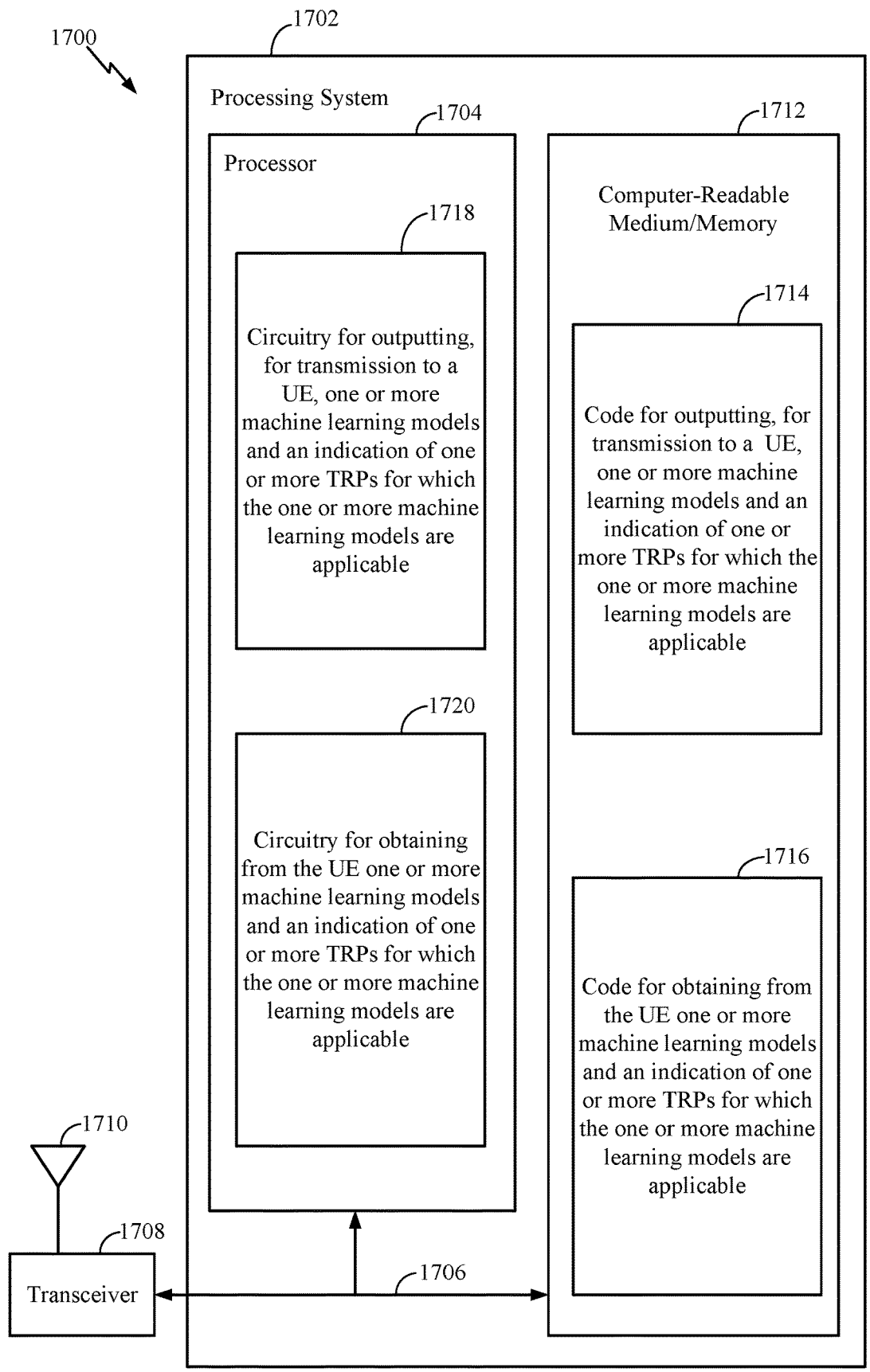

FIG. 17 illustrates a communications device 1700 that may include various components (e.g., corresponding to means-plus-function components) configured to perform operations for techniques disclosed herein, such as the operations illustrated in FIG. 10. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 is configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 10, or other operations for sharing TRP-specific machine learning models between UEs and BSs. In certain aspects, computer-readable medium/memory 1712 stores code 1714 for outputting for transmission and code 1716 for obtaining. The code 1714 for outputting for transmission may include code for outputting for transmission to a UE one or more machine learning models and an indication of one or more TRPs for which the one or more machine learning models are applicable. The code 1716 for obtaining may include code for obtaining from the UE one or more machine learning models and an indication of one or more TRPs for which the one or more machine learning models are applicable.

The processor 1704 may include circuitry configured to implement the code stored in the computer-readable medium/memory 1712, such as for performing the operations illustrated in FIG. 10, as well as other operations for sharing TRP-specific machine learning models between UEs and BSs. For example, the processor 1704 includes circuitry 1718 for outputting for transmission and circuitry 1720 for obtaining. The circuitry 1718 for outputting for transmission may include circuitry for outputting for transmission to a UE one or more machine learning models and an indication of one or more TRPs for which the one or more machine learning models are applicable. The circuitry 1720 for obtaining may include circuitry for receiving from the UE one or more machine learning models and an indication of one or more TRPs for which the one or more machine learning models are applicable.

Example Aspects

Implementation examples are described in the following numbered aspects.

In a first aspect, a method for wireless communications by a user equipment (UE), comprising: determining one or more machine learning models associated with at least one transmission and reception point (TRP) of one or more TRPs; and transmitting an indication of the one or more machine learning models to a network entity.

In a second aspect, alone or in combination with the first aspect, the indication indicates a single TRP for which each of the one or more machine learning models is applicable.

In a third aspect, alone or in combination with one or more of the first and second aspects, the indication indicates, for each of the one or more machine learning models, a TRP index for which a corresponding machine learning model is applicable.

In a fourth aspect, alone or in combination with one or more of the first through third aspects, after the UE moves from a first TRP to a second TRP of the one or more TRPs, transmitting to the network entity a notification to switch from a first machine learning model associated with the first TRP to a second machine learning model associated with the second TRP.

In a fifth aspect, alone or in combination with one or more of the first through fourth aspects, the notification is transmitted via a medium access control (MAC) control element (CE) or an uplink control information (UCI).

In a sixth aspect, alone or in combination with one or more of the first through fifth aspects, determining whether the first machine learning model applicable for the first TRP has sufficient training to operate; and one of: enabling the first machine learning model applicable for the first TRP based on the determination that the first machine learning model has the sufficient training; or disabling the first machine learning model applicable for the first TRP based on the determination that the first machine learning model does not have the sufficient training.

In a seventh aspect, alone or in combination with one or more of the first through sixth aspects, the indication indicates that the one or more machine learning models are associated with all of the one or more TRPs, and wherein the one or more TRPs are associated with a cell to which the UE is communicatively coupled.

In an eighth aspect, alone or in combination with one or more of the first through seventh aspects, the indication indicates that each of the one or more machine learning models is associated with a subset of the one or more TRPs.

In a ninth aspect, alone or in combination with one or more of the first through eighth aspects, after the UE moves from a first TRP to a second TRP of the one or more TRPs, determining whether to continue using a first machine learning model associated with the first TRP or to switch to another machine learning model based on whether the second TRP is in a same subset as the first TRP.

In a tenth aspect, alone or in combination with one or more of the first through ninth aspects, continuing using the first machine learning model based on the determination that the first TRP and the second TRP are in the same subset; and switching to a machine learning model associated with the second TRP based on the determination that the second TRP is in a different subset than the first TRP.

In an eleventh aspect, a method for wireless communications by a user equipment (UE), comprising: receiving, from a network entity, an indication of one or more machine learning models associated with at least one transmission and reception point (TRP) of one or more TRPs; and using at least one of the one or more machine learning models for applications related to the at least one TRP.

In a twelfth aspect, alone or in combination with the eleventh aspect, the indication indicates a single TRP for which each of the one or more machine learning models is applicable.

In a thirteenth aspect, alone or in combination with one or more of the eleventh and twelfth aspects, the indication indicates, for each of the one or more machine learning models, a TRP index for which a corresponding machine learning model is applicable.

In a fourteenth aspect, alone or in combination with one or more of the eleventh to thirteenth aspects, after the UE moves from a first TRP to a second TRP of the one or more TRPs, receiving from the network entity a notification to switch from a first machine learning model associated with the first TRP to a second machine learning model associated with the second TRP; and using the second machine learning model associated with the second TRP based on the TRP index.

In a fifteenth aspect, alone or in combination with one or more of the eleventh to fourteenth aspects, the notification is received via a medium access control (MAC) control element (CE) or a downlink control information (DCI).

In a sixteenth aspect, alone or in combination with one or more of the eleventh to fifteenth aspects, determining whether the first machine learning model applicable for the first TRP has sufficient training to operate; and one of: enabling the first machine learning model applicable for the first TRP based on the determination that the first machine learning model has the sufficient training; or disabling the first machine learning model applicable for the first TRP based on the determination that the first machine learning model does not have the sufficient training.

In a seventeenth aspect, alone or in combination with one or more of the eleventh to sixteenth aspects, the indication indicates that the one or more machine learning models are associated with all of the one or more TRPs, and wherein the one or more TRPs are associated with a cell to which the UE is communicatively coupled.

In an eighteenth aspect, alone or in combination with one or more of the eleventh to seventeenth aspects, the indication indicates that each of the one or more machine learning models is associated with a subset of the one or more TRPs.

In a nineteenth aspect, alone or in combination with one or more of the eleventh to eighteenth aspects, after the UE moves from a first TRP to a second TRP of the one or more TRPs, determining whether to continue using a first machine learning model associated with the first TRP or to switch to another machine learning model based on whether the second TRP is in a same subset as the first TRP.

In a twentieth aspect, alone or in combination with one or more of the eleventh to nineteenth aspects, continuing using the first machine learning model based on the determination that the first TRP and the second TRP are in the same subset;

and switching to a machine learning model associated with the second TRP based on the determination that the second TRP is in a different subset than the first TRP.

In a twenty-first aspect, a method for wireless communications by a network entity, comprising: receiving, from a user equipment (UE), an indication of one or more machine learning models associated with at least one transmission and reception point (TRP) of one or more TRPs supported by the network entity; and associating the one or more machine learning models with the at least one TRP.

In a twenty-second aspect, alone or in combination with the twenty-first aspect, the indication indicates a single TRP for which each of the one or more machine learning models is applicable.

In a twenty-third aspect, alone or in combination with one or more of the twenty-first and twenty-second aspects, the indication indicates, for each of the one or more machine learning models, a TRP index for which a corresponding machine learning model is applicable.

In a twenty-fourth aspect, alone or in combination with one or more of the twenty-first to twenty-third aspects, the indication indicates that the one or more machine learning models are associated with all of the one or more TRPs, and wherein the one or more TRPs are associated with a cell to which the UE is communicatively coupled.

In a twenty-fifth aspect, alone or in combination with one or more of the twenty-first to twenty-fourth aspects, the indication indicates that each of the one or more machine learning models is associated with a subset of the one or more TRPs.

In a twenty-sixth aspect, a method for wireless communications by a network entity, comprising: determining one or more machine learning models associated with at least one transmission and reception point (TRP) of one or more TRPs supported by the network entity; and transmitting, to a user equipment (UE), an indication of the one or more machine learning models.

In a twenty-seventh aspect, alone or in combination with the twenty-sixth aspect, the indication indicates a single TRP for which each of the one or more machine learning models is applicable.

In a twenty-eighth aspect, alone or in combination with one or more of the twenty-sixth and twenty-seventh aspects, the indication indicates, for each of the one or more machine learning models, a TRP index for which a corresponding machine learning model is applicable.

In a twenty-ninth aspect, alone or in combination with one or more of the twenty-sixth to twenty-eighth aspects, the indication indicates that the one or more machine learning models are associated with all of the one or more TRPs, and wherein the one or more TRPs are associated with a cell to which the UE is communicatively coupled.

In a thirtieth aspect, alone or in combination with one or more of the twenty-sixth to twenty-ninth aspects, the indication indicates that each of the one or more machine learning models is associated with a subset of the one or more TRPs.

An apparatus for wireless communication, comprising at least one processor; and a memory coupled to the at least one processor, the memory comprising code executable by the at least one processor to cause the apparatus to perform the method of any of the first through thirtieth aspects.

An apparatus comprising means for performing the method of any of the first through thirtieth aspects.

A computer readable medium storing computer executable code thereon for wireless communications that, when executed by at least one processor, cause an apparatus to perform the method of any of the first through thirtieth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless node, a wireless communications node, a wireless device, a wireless communications device, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a user equipment (UE), comprising:
one or more memories comprising instructions; and
one or more processors configured, individually or in any combination, to execute the instructions and cause the apparatus to:
transmit, to a network entity, an indication that identifies one or more machine learning models that are associated with one or more transmission and reception points (TRPs) of a plurality of TRPs, wherein the indication includes, for each of the one or more machine learning models, an identifier associated with a corresponding machine learning model of the one or more machine learning models; and
transmit a notification to switch from a first machine learning model of the one or more machine learning models, the first machine learning model associated with a first TRP of the plurality of TRPs, to a second machine learning model of the one or more machine learning models, the second machine learning model associated with a second TRP of the plurality of TRPs.

2. The apparatus of claim 1, wherein the indication further identifies a single TRP of the plurality of TRPs which is associated with each of the one or more machine learning models.

3. The apparatus of claim 1, wherein the notification is transmitted via a medium access control (MAC) control element (CE) or an uplink control information (UCI).

4. The apparatus of claim 1, wherein the one or more processors are configured, individually or in any combination, to execute the instructions and cause the apparatus to:
enable the first machine learning model associated with the first TRP if the first machine learning model has sufficient training for operation; or
disable the first machine learning model associated with the first TRP if the first machine learning model does not have the sufficient training for operation.

5. The apparatus of claim 1, wherein the indication further identifies that the one or more machine learning models are associated with all of the plurality of TRPs, and wherein the plurality of TRPs are associated with a cell to which the UE is communicatively coupled.

6. The apparatus of claim 1, wherein the indication further identifies that each of the one or more machine learning models is associated with a subset of the plurality of TRPs.

7. An apparatus for wireless communications by a user equipment (UE), comprising:
one or more memories comprising instructions; and
one or more processors configured, individually or in any combination, to execute the instructions and cause the apparatus to:
receive, from a network entity, an indication of one or more machine learning models associated with two or more transmission and reception points (TRPs), wherein the indication includes, for each of the one or more machine learning models, an identifier associated with a corresponding machine learning model of the one or more machine learning models;
use at least one machine learning model for applications related to a TRP;
receive a notification to switch from a first machine learning model of the one or more machine learning models, the first machine learning model associated with a first TRP of the two or more TRPs, to a second machine learning model of the one or more machine learning models, the second machine learning model associated with a second TRP of the two or more TRPs; and
use the second machine learning model associated with the second TRP based on the identifier.

8. The apparatus of claim 7, wherein the indication further identifies a single TRP of the two or more TRPs which is associated with each of the one or more machine learning models.

9. The apparatus of claim 7, wherein the notification is received via a medium access control (MAC) control element (CE) or a downlink control information (DCI).

10. The apparatus of claim 7, wherein the one or more processors are configured, individually or in any combination, to execute the instructions and cause the apparatus to:
enable the first machine learning model associated with the first TRP if the first machine learning model has sufficient training for operation; or
disable the first machine learning model associated with the first TRP if the first machine learning model does not have the sufficient training for operation.

11. The apparatus of claim 7, wherein the indication further identifies that the one or more machine learning models are associated with all of the two or more TRPs, and wherein the two or more TRPs are associated with a cell to which the UE is communicatively coupled.

12. The apparatus of claim 7, wherein the indication further identifies that each of the one or more machine learning models is associated with a subset of the two or more TRPs.

13. An apparatus for wireless communications by a wireless node, comprising:
one or more memories comprising instructions; and
one or more processors configured, individually or in any combination, to execute the instructions and cause the apparatus to:
receive, from a user equipment (UE), an indication that identifies one or more machine learning models as being associated with at least one transmission and reception point (TRP) of a plurality of TRPs supported by the wireless node, wherein the indication includes, for each of the one or more machine learning models, an identifier associated with a corresponding machine learning model of the one or more machine learning models;
associate the one or more machine learning models with the at least one TRP; and
transmit, to the UE, a notification to switch from a first machine learning model of the one or more machine learning models, the first machine learning model associated with a first TRP of the plurality of TRPs, to a second machine learning model of the one or more machine learning models, the second machine learning model associated with a second TRP of the plurality of TRPs.

14. The apparatus of claim 13, wherein the indication further identifies a single TRP of the plurality of TRPs which is associated with each of the one or more machine learning models.

15. The apparatus of claim 13, wherein the indication further identifies that the one or more machine learning models are associated with all of the plurality of TRPs, and wherein the plurality of TRPs are associated with a cell.

16. The apparatus of claim 13, wherein the indication further identifies that each of the one or more machine learning models is associated with a subset of the plurality of TRPs.

17. An apparatus for wireless communications by a wireless node, comprising:
one or more memories comprising instructions; and
one or more processors configured, individually or in any combination, to execute the instructions and cause the apparatus to:
transmit, to a user equipment (UE), an indication of at least one machine learning model of one or more machine learning models, wherein the indication identifies, for each of the one or more machine learning models, an identifier associated with a corresponding machine learning model of the one or more machine learning models; and
transmit, to the UE, a notification to switch from a first machine learning model of the one or more machine learning models, the first machine learning model associated with a first transmission and reception point (TRP) of two or more TRPs to a second machine learning model of the one or more machine learning models, the second machine learning model associated with a second TRP of the two or more TRPs.

18. The apparatus of claim 17, wherein the indication further identifies a single TRP of the two or more TRPs which is associated with each of the one or more machine learning models.

19. The apparatus of claim 17, wherein the indication further identifies that the one or more machine learning models are associated with all of the two or more TRPs, and wherein the two or more TRPs are associated with a cell.

20. The apparatus of claim 17, wherein the indication further identifies that each of the one or more machine learning models is associated with a subset of the two or more TRPs.

21. The apparatus of claim 13, wherein the one or more processors are configured, individually or in any combination, to execute the instructions and cause the apparatus to:
enable the first machine learning model associated with the first TRP if the first machine learning model has sufficient training for operation; or
disable the first machine learning model associated with the first TRP if the first machine learning model does not have the sufficient training for operation.

22. The apparatus of claim 17, wherein the one or more processors are configured, individually or in any combination, to execute the instructions and cause the apparatus to:
enable the first machine learning model associated for the first TRP if the first machine learning model has sufficient training for operation; or
disable the first machine learning model associated for the first TRP if the first machine learning model does not have the sufficient training for operation.

23. The apparatus of claim 1, wherein the one or more processors are configured, individually or in any combination, to execute the instructions and cause the apparatus to select the one or more machine learning models that are associated with the one or more TRPs of the plurality of TRPs.

24. The apparatus of claim 7, wherein the one or more processors are configured, individually or in any combination, to execute the instructions and cause the apparatus to select the at least one machine learning model from the one or more machine learning models, for the applications related to the TRP, based at least in part on a connection state with the TRP.

25. The apparatus of claim 17, wherein the one or more processors are configured, individually or in any combination, to execute the instructions and cause the apparatus to select the at least one machine learning model, from the one or more machine learning models associated with the two or more TRPs supported by the wireless node, for applications related to a TRP, based at least in part on a connection state with the TRP.

26. The apparatus of claim 1, wherein the identifier comprises a TRP index.

27. The apparatus of claim 1, wherein the notification is associated with mobility of the UE between the first TRP and the second TRP.

28. The apparatus of claim 7, wherein the identifier comprises a TRP index, and wherein the notification is associated with mobility of the UE between the first TRP and the second TRP.

29. The apparatus of claim 13, wherein the identifier comprises a TRP index, and wherein the notification is associated with mobility of the UE between the first TRP and the second TRP.

30. The apparatus of claim 17, wherein the identifier comprises a TRP index, and wherein the notification is associated with mobility of the UE between the first TRP and the second TRP.

* * * * *